(12) United States Patent
Oden et al.

(10) Patent No.: US 10,748,158 B2
(45) Date of Patent: Aug. 18, 2020

(54) METHOD AND SYSTEM FOR MONITORING AN ISSUE

(75) Inventors: William R. Oden, Tulsa, OK (US); Matthew D. Galloway, Tulsa, OK (US); Monica A. Murray, Tulsa, OK (US); Daniel Nelson, Tulsa, OK (US); Joseph Baumgartner, Tulsa, OK (US)

(73) Assignee: Refinitiv US Organization LLC, New York, NY (US)

( * ) Notice: Subject to any disclaimer, the term of this patent is extended or adjusted under 35 U.S.C. 154(b) by 1036 days.

(21) Appl. No.: 11/245,240

(22) Filed: Oct. 7, 2005

(65) Prior Publication Data
US 2006/0085238 A1 Apr. 20, 2006

Related U.S. Application Data

(60) Provisional application No. 60/616,644, filed on Oct. 8, 2004, provisional application No. 60/714,825, filed on Sep. 8, 2005.

(51) Int. Cl.
*G06Q 30/02* (2012.01)
*G06Q 10/06* (2012.01)

(52) U.S. Cl.
CPC ....... *G06Q 30/02* (2013.01); *G06Q 10/06311* (2013.01); *G06Q 10/063114* (2013.01); *G06Q 10/063118* (2013.01)

(58) Field of Classification Search
CPC ....... G06Q 10/06314; G06Q 10/06037; G06Q 10/06315; G06Q 10/06311;
(Continued)

(56) References Cited

U.S. PATENT DOCUMENTS 5,428,606 A 6/1995 Moskowitz
5,768,528 A 6/1998 Stumm
(Continued)

FOREIGN PATENT DOCUMENTS

WO WO-03043286 A2 5/2003

OTHER PUBLICATIONS

LexisNexis Courtlink Step-By-Step Guide Mar. 17, 2005, pp. 1-30.
(Continued)

*Primary Examiner* — Matthew S Gart
*Assistant Examiner* — Stephen S Swartz
(74) *Attorney, Agent, or Firm* — Norton Rose Fulbright US LLP

(57) ABSTRACT

The present invention is a web-based software application designed to monitor implementation of an issue. The invention includes receiving information from a user on the issue to be monitored; receiving information from a user on an assignment on the issue; and sending the assignment to a recipient. An acknowledgement is received from the recipient on the assignment. Reminders are forwarded to the recipient when the acknowledgement is not received within a predetermined time period, and the reminders can be automatically forwarded at predetermined time periods. Information is received on the issues from a user or an external source, and listed in a form which can be filtered and sorted according to predetermined criteria. A completion status of the regulatory issue can be displayed.

23 Claims, 26 Drawing Sheets

(58) Field of Classification Search
CPC ..... G06Q 10/06114; G06Q 10/063118; G06Q 10/06; H04L 65/103
See application file for complete search history.

(56) References Cited

U.S. PATENT DOCUMENTS

| | | | |
|---|---|---|---|
| 5,790,935 A | | 8/1998 | Payton |
| 5,826,239 A | * | 10/1998 | Du et al. ..................... 705/7.26 |
| 5,991,733 A | * | 11/1999 | Aleia et al. .................. 705/7.13 |
| 6,112,181 A | | 8/2000 | Shear et al. |
| 6,154,781 A | | 11/2000 | Bolam et al. |
| 6,161,113 A | * | 12/2000 | Mora et al. ................... 715/234 |
| 6,192,407 B1 | | 2/2001 | Smith et al. |
| 6,236,991 B1 | | 5/2001 | Frauenhofer et al. |
| 6,243,757 B1 | | 6/2001 | Kanodia et al. |
| 6,385,655 B1 | | 5/2002 | Smith et al. |
| 6,430,538 B1 | * | 8/2002 | Bacon et al. ................. 705/7.21 |
| 6,460,036 B1 | | 10/2002 | Herz |
| 6,487,599 B1 | | 11/2002 | Smith et al. |
| 6,501,421 B1 | | 12/2002 | Dutta et al. |
| 6,594,682 B2 | | 7/2003 | Peterson et al. |
| 6,606,744 B1 | * | 8/2003 | Mikurak ................ H04L 29/06 717/174 |
| 6,636,822 B2 | * | 10/2003 | Englander ..................... 702/108 |
| 6,636,886 B1 | | 10/2003 | Katiyar et al. |
| 6,643,682 B1 | | 11/2003 | Todd et al. |
| 6,694,316 B1 | | 2/2004 | Langseth et al. |
| 6,701,316 B1 | | 3/2004 | Li et al. |
| 6,718,369 B1 | | 4/2004 | Dutta |
| 6,874,011 B1 | | 3/2005 | Spielman et al. |
| 6,912,502 B1 | * | 6/2005 | Buddle et al. ................ 705/7.41 |
| 6,944,658 B1 | | 9/2005 | Schneider |
| 6,976,010 B2 | | 12/2005 | Banerjee et al. |
| 7,028,082 B1 | | 4/2006 | Rosenberg et al. |
| 7,051,073 B1 | | 5/2006 | Dutta |
| 7,168,045 B2 | * | 1/2007 | Fliess et al. .................. 715/771 |
| 7,177,859 B2 | | 2/2007 | Pather et al. |
| 7,213,005 B2 | | 5/2007 | Mourad et al. |
| 7,236,966 B1 | * | 6/2007 | Jackson et al. |
| 7,266,826 B2 | | 9/2007 | Katiyar et al. |
| 7,305,392 B1 | * | 12/2007 | Abrams et al. ............... 707/770 |
| 7,349,980 B1 | | 3/2008 | Darugar et al. |
| 7,364,067 B2 | * | 4/2008 | Steusloff et al. .............. 235/375 |
| 7,403,948 B2 | * | 7/2008 | Ghoneimy et al. ........... 707/792 |
| 7,433,876 B2 | | 10/2008 | Spivack et al. |
| 7,437,375 B2 | | 10/2008 | Borthakur et al. |
| 7,519,546 B2 | | 4/2009 | Murren et al. |
| 7,529,712 B2 | | 5/2009 | Heaven et al. |
| 7,587,450 B2 | | 9/2009 | Morris |
| 7,587,504 B2 | | 9/2009 | Adams et al. |
| 7,590,866 B2 | | 9/2009 | Hurtado et al. |
| 7,599,844 B2 | | 10/2009 | King et al. |
| 7,640,184 B1 | | 12/2009 | Lunt |
| 7,680,855 B2 | | 3/2010 | Hyder et al. |
| 7,685,247 B2 | | 3/2010 | Codignotto |
| 7,685,265 B1 | | 3/2010 | Nguyen et al. |
| 7,698,151 B2 | | 4/2010 | Gozzo et al. |
| 7,779,097 B2 | | 8/2010 | Lamkin et al. |
| 7,788,403 B2 | | 8/2010 | Darugar et al. |
| 7,886,180 B2 | | 2/2011 | Jin et al. |
| 7,941,431 B2 | | 5/2011 | Bluhm et al. |
| 2001/0047276 A1 | | 11/2001 | Eisenhart |
| 2001/0049721 A1 | | 12/2001 | Blair et al. |
| 2001/0056354 A1 | | 12/2001 | Feit et al. |
| 2002/0049621 A1 | * | 4/2002 | Bruce ............................ 705/7 |
| 2002/0055849 A1 | * | 5/2002 | Georgakopoulos et al. ..... 705/1 |
| 2002/0095399 A1 | | 7/2002 | Devine et al. |
| 2002/0178119 A1 | * | 11/2002 | Griffin et al. ................. 705/54 |
| 2002/0194014 A1 | * | 12/2002 | Starnes et al. ................. 705/1 |
| 2003/0004880 A1 | | 1/2003 | Banerjee et al. |
| 2003/0018510 A1 | * | 1/2003 | Sanches ................ G06Q 10/06 717/102 |
| 2003/0023675 A1 | * | 1/2003 | Ouchi .................... G06Q 10/10 709/203 |
| 2003/0061225 A1 | * | 3/2003 | Bowman et al. ............. 707/100 |
| 2003/0069894 A1 | * | 4/2003 | Cotter et al. ................ 707/104.1 |
| 2003/0083891 A1 | * | 5/2003 | Lang et al. ........................ 705/1 |
| 2003/0120559 A1 | | 6/2003 | Don |
| 2003/0126136 A1 | | 7/2003 | Omoigui |
| 2003/0135556 A1 | | 7/2003 | Holdsworth |
| 2003/0149578 A1 | * | 8/2003 | Wong .................... G06Q 10/087 705/7.22 |
| 2003/0233372 A1 | | 12/2003 | Warner et al. |
| 2004/0002958 A1 | | 1/2004 | Seshadri et al. |
| 2004/0010425 A1 | * | 1/2004 | Wilkes et al. .................... 705/3 |
| 2004/0019645 A1 | | 1/2004 | Goodman et al. |
| 2004/0061716 A1 | | 4/2004 | Cheung et al. |
| 2004/0093323 A1 | | 5/2004 | Bluhm et al. |
| 2004/0122906 A1 | | 6/2004 | Goodman et al. |
| 2004/0138925 A1 | * | 7/2004 | Zheng ............................. 705/2 |
| 2004/0153453 A1 | | 8/2004 | Brodie et al. |
| 2005/0033657 A1 | | 2/2005 | Herrington et al. |
| 2005/0039136 A1 | | 2/2005 | Othmer |
| 2005/0069847 A1 | | 3/2005 | Carter |
| 2005/0091269 A1 | * | 4/2005 | Gerber et al. ............ 707/103 X |
| 2005/0114829 A1 | * | 5/2005 | Robin et al. .................. 717/101 |
| 2005/0138063 A1 | | 6/2005 | Bazot et al. |
| 2005/0216555 A1 | | 9/2005 | English et al. |
| 2005/0267896 A1 | | 12/2005 | Goodman et al. |
| 2005/0267973 A1 | | 12/2005 | Carlson et al. |
| 2005/0273499 A1 | | 12/2005 | Goodman et al. |
| 2006/0041593 A1 | | 2/2006 | Borthakur et al. |
| 2006/0085238 A1 | | 4/2006 | Oden et al. |
| 2006/0117035 A1 | | 6/2006 | Stewart et al. |
| 2006/0175399 A1 | * | 8/2006 | Steusloff et al. ............. 235/382 |
| 2006/0178913 A1 | * | 8/2006 | Lara et al. ........................ 705/3 |
| 2006/0212698 A1 | | 9/2006 | Peckover |
| 2006/0253455 A1 | | 11/2006 | Potra et al. |
| 2006/0294077 A1 | | 12/2006 | Bluhm et al. |
| 2007/0011067 A1 | | 1/2007 | Seelos et al. |
| 2007/0061366 A1 | | 3/2007 | Oden et al. |
| 2007/0061487 A1 | | 3/2007 | Moore et al. |
| 2007/0094661 A1 | | 4/2007 | Baird et al. |
| 2007/0143502 A1 | | 6/2007 | Garcia-Martin et al. |
| 2008/0086573 A1 | | 4/2008 | Martinez et al. |
| 2008/0086684 A1 | * | 4/2008 | Hertel et al. .................. 715/700 |
| 2008/0162570 A1 | | 7/2008 | Kindig et al. |
| 2008/0294794 A1 | | 11/2008 | Darugar et al. |
| 2008/0306959 A1 | | 12/2008 | Spivack et al. |
| 2010/0042441 A1 | * | 2/2010 | Steusloff et al. .................. 705/3 |

OTHER PUBLICATIONS

Pohmolka, V., The 2001 Lawyers Software Guide, National, Aug./Sep. 1-16, 2001.
LexisNexis PCLaw User Guide Version 7.5 (2005), LexisNexis Practice Management Systems, pp. 1-685.
What to Look for in Case Management Software, 2004, The McNeill Group, pp. 1-16.
Staudt, R.W., Perspectives on Knowledge Management in Law Firms, 2003, LexisNexis, pp. 1-13.
Time Matters 5.0 Brochure, 2003, LexisNexis, pp. 1-4.
Cameron, B, et al., Time Matters vs. Amicus Attorney, 2004, Technology for Lawyers, pp. 1-97.
Time Matters 5.0 Practice Management Software, Department of Clinical Legal Studies, 2004, USC School of Law, pp. 1-15.
Umar, A., IT Infrastructure to Enable Next Generation Enterprises, 2005, Information Systems Frontiers, vol. 7, No. 3, pp. 217-256.

\* cited by examiner

FIG. 2

| Issues | Issues | Utilities | Preferences | Reports | Help | Logout |

Issues (21)

Filter  *Show Advanced Filter*

| Issue Owner | Jurisdictions | Categories | Status |
|---|---|---|---|
| any ▾ | any ▾ | any ▾ | Open ▾ |

[Filter] [Reset]

[Add Issue] [Add FYI Issue]

1 2 3

| Issue ▼ | % | Priority | Jurisdictions | Citation | Categories | Compliance | Created | Issue Owner | Edit |
|---|---|---|---|---|---|---|---|---|---|
| 05-07041 | 0% | High | North Dakota | NDAC 45-14-01-01 et al | All | 9/17/2005 | 7/19/2005 | Person A | ⧉ |
| 05-07039 | | Normal | Rhode Island | new citation | All | 7/29/2005 | 7/19/2005 | Person A | ⧉ |
| 05-07037 | | Normal | Rhode Island | new citation | External Issue, Internal Issue, Privacy | 7/27/2005 | 5/20/2005 | Person A | ⧉ |

1 2 3

[Add Issue] [Add FYI Issue]

FIG. 3

Issues (21)

Filter  Hide Advanced Filter

| Issue Owner | Jurisdictions | Categories | Status |
|---|---|---|---|
| any ▽ | any ▽ | any ▽ | Open ▽ |

[Filter] [Reset]

| Priority | Departments | Businesses | Products |
|---|---|---|---|
| any ▽ | any ▽ | any ▽ | any ▽ |

Start Date    End Date

Enacted Date    [____] 12    [____] 12

Effective Date  [____] 12    [____] 12

Compliance Date [____] 12    [____] 12

Issue Number    [_____]

Text Search     [_____]

FIG. 4

View Issue — Issues | Utilities | Preferences | Reports | Help | Logout

Issue No. 05-07041

[Edit Issue] [Back]

Show/Hide Details

Jurisdictions
North Dakota

Overview
North Dakota's "opt out" provisions...

{ 201 }

Attachments (1)

| Attachment Name | File Name | File Type |
|---|---|---|
| ND Consumer Privacy Regulation 45-15 | ND Consumer Privacy Regulation 45-15.doc | MSWORD |

{ 202 }

Projects (1)

| Project No. | Action | % | Description | Status | Target Response Creation | Manager/Implementer | Edit |
|---|---|---|---|---|---|---|---|
| 1 | | 0% | Change the content of our current... | In Process | 9/7/2005 | Person B | |
| | A | ● | Change the "opt out" language in... | Awaiting Acknowledgement | 9/7/2005 | Person C | |
| | B | | Please assist Person C in... | Ready For Approval | 9/7/2005 | Person D | |

{ 206 }

Observers

| Observer ▲ | Initial Contact | Last Contact | Status |
|---|---|---|---|
| Person H | 7/19/2005 | 7/19/2005 | Awaiting Acknowledgement |

{ 207 }

Notes (1)

| Date Added ▲ | Author | Note | Edit |
|---|---|---|---|
| 7/19/2005 6:47:04 AM | Person A | Be sure to look at the archive files for ND to evaluate any previous changes we have made in ND | |

Add Note
[                                   ]
[Save Note]

{ 203 }

Journal
[Show Journal]

{ 204 }

Audit Field Information

| Created By | Created On | Modified By | Modified On |
|---|---|---|---|
| Person A | 7/19/2005 8:46:59 AM | Person A | 7/19/2005 8:46:59 AM |

{ 205 }

[Edit Issue] [Back]

FIG. 5

Issue Owner
Person A

Status
0% Open

Priority
High

Enacted Date
7/19/2005

Effective Date
9/2/2005

Compliance date
9/17/2005

Source
Capital action

Jurisdictions
North Dakota

Citations
NDAC 45-14-01-01 et al

Overview
North Dakota's "opt out" provisions have been replaced...

Issue Details
As of 7/19/2005, nonpublic personal information...

Categories
All
External Issue, Internal Issue, Long Term Care, P&C, Privacy

Businesses
All
Annuties, Corporate, Life, Property & Casualty, Term Life

Departments
All
Compliance, Information Systems, Legal, P&C, Sales & Marketing

Products
All
Annuities, Commercial Auto, Commercial Excess, Inland Marine, Life...

FIG. 6

```
              Issues  Utilities  Preferences  Reports  Help  Logout      ─── 300
         Edit Issue Issue No. 05-07041                                        🖫 🖶 ⓘ
  [Save/Return] [Save] [Cancel Issue] [View Issue] [Send Assignments] [Back]  ⎫
  Issue Owner        Status             Priority                               ⎬ 301
  👤[Person A] ✓    0% Open            [High    ] ✓                           ⎭
  Enacted Date       Effective Date     Compliance date
  [7/19/2005] [12]   [9/2/2005] [12]    [9/17/2005] [12]                       ⎫
  Source                                                                       │
  [Capital action]  ☐ Save Source in List                                      │
  Jurisdictions 🖉                                                             │
  North Dakota                                                                 │
  Citations                                                                    │
  ┌───────────────────────────────────────────────────────────┐▲              │
  │ NDAC 45-14-01-01 et al                                    │▼              │
  └───────────────────────────────────────────────────────────┘               │
  Overview 🗛                                                                  ⎬ 302
  ┌───────────────────────────────────────────────────────────┐▲              │
  │ North Dakota's "opt out" provisions...                    │▼              │
  └───────────────────────────────────────────────────────────┘               │
  Issue Details                                                                │
  🗔                                                                           │
  ┌───────────────────────────────────────────────────────────┐               │
  │ As of 7/19/2005, nonpublic personal information, no matter where it was collected... │
  └───────────────────────────────────────────────────────────┘               ⎭
  ☐ HTML Mode
  Categories 🖉                                                                ⎫
  All                                                                          │
  External Issue, Internal Issue, Long Term Care, P&C, Privacy                 │
  Businesses 🖉                                                                │
  All                                                                          │
  Annuities, Corporate, Life, Property & Casualty, Term Life                   │
  Departments 🖉                                                               ⎬ 303
  All                                                                          │
  Compliance, Information Systems, Legal, P&C, Sales & Marketing               │
  Products 🖉                                                                  │
  All                                                                          │
  Annuities, Commercial Auto, Commercial Excess, Inland Mareine, Life          ⎭
  ╲ Attachments (1)                                                       ⓘ
  ┌─────────────────────┬─────────────────────┬───────────┬──────┐             ⎫
  │ Attachment Name     │ File Name           │ File Type │ Edit │             │
  ├─────────────────────┼─────────────────────┼───────────┼──────┤             ⎬ 304
  │ ND Consumer Privacy │ ND Consumer Privacy │ MSWORD    │  🖉  │             │
  │ Regulation 45-15 doc│ Regulation 45-15 doc│           │      │             │
  └─────────────────────┴─────────────────────┴───────────┴──────┘             │
  [Add Attachment]                                                              ⎭
```

FIG. 7

Jurisdictions
- ☐ All

| | | | |
|---|---|---|---|
| ☐ Alabama | ☐ Alaska | ☐ Arizona | ☐ Arkansas |
| ☐ California | ☐ Colorado | ☐ Connecticut | ☐ Delaware |
| ☐ Florida | ☐ Georgia | ☐ Hawaii | ☐ Idaho |
| ☐ Illinois | ☐ Indiana | ☐ Iowa | ☐ Kansas |
| ☐ Kentucky | ☐ Louisiana | ☐ Maine | ☐ Maryland |
| ☐ Massachusetts | ☐ Michigan | ☐ Minnesota | ☐ Mississippi |
| ☐ Missouri | ☐ Montana | ☐ Missouri | ☐ Nevada |
| ☐ New Hampshire | ☐ New Jersey | ☐ New Mexico | ☐ New York |
| ☐ North Carolina | ☑ North Dakota | ☐ Ohio | ☐ Oklahoma |
| ☐ Oregon | ☐ Pennsylvania | ☐ Rhode Island | ☐ South Carolina |
| ☐ South Dakota | ☐ Tennessee | ☐ Texas | ☐ Utah |
| ☐ Vermont | ☐ Virginia | ☐ Washington | ☐ Washington DC |
| ☐ West Virginia | ☐ Wisconsin | ☐ Wyoming | |

Citations

NDAC 45-14-01-01 et al

Overview 

North Dakota's "opt out" provisions have been replaced...

Issue Details

As of 7/19/2005, nonpublic personal information, no matter where...

FIG. 13A

Issues  Utilities  Preferences  Reports  Help  Logout
Duplicate Issue

① Check the elements that you would like to copy to the new issue that you...

Duplicate Issue

[Create Issue]  [Back]

☑ Enacted Date
7/19/2005

☑ Effective Date
9/2/2005

☑ Compliance Date
9/17/2005

☑ Source
Capitol Action

☑ Jurisdiction
North Dakota

☑ Citations
NDAC 45-14-01-01 et al

☑ Overview
North Dakota's "opt out" provisions have been replaces with disclosure...

☑ Issue Details
As of 7/19/2005, nonpublic personal information, no matter where...

☑ Categories
All
External Issue, Internal Issue, Long Term Care, P&C, Privacy ☑ Businesses
All
Annuities, Corporate, Life, Property & Casualty, Term Life ☑ Departments
All
Compliance, Information Systems, Legal, P$C, Sales & Marketing ☑ Products
All
Annuities, Commercial Auto, Commercial Excess, Inland Marine, Life ☑ Copy Attachments

FIG. 14

| Projects (2) | | | | | | |
|---|---|---|---|---|---|---|
| Project No. | Action | % | Description | Status | Target Response Creation | Manager/ Implementer | Edit |
| 1 | | 0% | Change the content of our current Privacy notices and contracts to reflect this change. | In Process | 9/7/2005 7/24/2005 7/19/2005 | Person B | |
| | A | ● | Change the "opt out" language in our privacy notices to reflect the new "opt in" requirements. | Awaiting Acknowledgement | 9/7/2005 7/24/2005 7/19/2005 | Person C | |
| | B | | Please assist Person A in complying with Regulation 45-14 "opt in" privacy requirements. | Ready For Approval | 9/7/2005 7/24/2005 7/19/2005 | Person D | |

[Add Projects] [Send Assignments]

FIG. 15

Issue No. 05-07041-Project No. 2

[Edit Project] [Back]

Project Manager
Person A
Status
0% Awaiting Acknowledgement
Description
Insurers must now obtain the consumer's authorization...

Response Due
7/24/2005

Response Date Reminder
None repeated Once

Target Completion
9/7/2005

Target Date Reminder
None repeated Once

Attachments (0)

No Attachments

Action Plan-Items (1)

| Action | Action | % | Instructions | Target Date | Completion Date | Status | Edit |
|---|---|---|---|---|---|---|---|
| A | Person A | ● | Analyze changes in the database... | 9/7/2005 | N/A | Awaiting Acknowledgement | |

Observers

| Observer ▲ | Initial Contact | Last Contact | Status |
|---|---|---|---|
| Person H | 7/19/2005 | 7/19/2005 | Awaiting Acknowledgement |

Notes (1)

| Date Added ▲ | Author | Note | Edit |
|---|---|---|---|
| 7/19/2005 6:47:04 AM | Person A | Followed up with Person G on ND staffing issues. He says the office is good-to-go and is awaiting completion of this project to move forward. Manufacture... | |

Add Note

[Save Note]

Journal

[Show Journal]

Audit Field Information

| Created By | Created On | Modified By | Modified On |
|---|---|---|---|
| Person C | 7/19/2005 8:47:01 AM | Person C | 7/20/2005 11:28:00 AM |

[Edit Project] [Back]

FIG. 16A

Edit Project     Issues    Utilities    Preferences    Reports    Help    Logout

Issue No. 05-07041-Project No. 2

[Save/Return] [Save] [Send Assignment] [View Issue] [View Project] [Back]

Project Manager
[Person A ✓] [12]

Status
0% Awaiting Acknowledgement

Description
Insurers must now obtain the consumer's authorization...
☐ HTML Mode

| Response Due | Response Date Reminder | | |
|---|---|---|---|
| 7/24/2005 [12] | [None ✓] | repeated | [Once ✓] |
| Target Completion | Target Date Reminder | | |
| 9/7/2005 [12] | [None ✓] | repeated | [Once ✓] |

\ Attachments (0)

No Attachments
[Add Attachment]

Action Plan-Items (2)

| Action | Action | % | Instructions | Target Date | Completion Date | Status | Edit |
|---|---|---|---|---|---|---|---|
| A | Person A | ● | Analyze changes... | 9/7/2005 | N/A | Awaiting Acknowledgement | 📝 |
| B | Person B | | Write Specs... | 9/7/2005 | N/A | Ready for Approval | 📝 |

[Add Actions]

FIG. 16B

| Observers | | | | |
|---|---|---|---|---|
| Observer ▲ | Initial Contact | Last Contact | | Status |
| Person H | N/A | N/A | | Not Sent |

| Address Book | Address Group | Observers |
|---|---|---|
| Person A<br>Person B<br>Person C<br>Person D<br>Person E<br>Person F | All Users ✓<br>Add ⇒<br>⇐ Remove | Person A |

⎬ 505

Notes (1)

| Date Added ▲ | Author | Note | Edit |
|---|---|---|---|
| 7/19/2005<br>6:47:04 AM | Person A | Followed up with Person G on ND staffing issues... | |

Add Note

[                              ]

[Save Note]

⎬ 506

Journal

[Show Journal]

⎬ 507

Audit Field Information

| Created By | Created On | Modified By | Modified On |
|---|---|---|---|
| Person C | 7/19/2005 8:47:01 AM | Person C | 7/20/2005 11:28:00 AM |

⎬ 508

[Save/Return] [Save] [Send Assignment] [Delete] [View Project] [Back]

FIG. 17

| | Issues | Utilities | Preferences | Reports | Help | Logout |

Duplicate Project

ⓘ Check the items that you would like to duplicate, then select the Duplicate button...

Duplicate Action-Issue No. 05-07041 Project-No.2

[Duplicate] [Back]

Project Managers

ⓘ Each project can have one project manager...

| Address Book | Address Group | Project Managers |
|---|---|---|
| Person A<br>Person B<br>Person C<br>Person D | All Users ✓<br>[Add ⇒]<br>[⇐ Remove] | Person A |

☑ Description
Insurers must now obtain the consumer's...

☑ Response Date Reminder
None repeated Once

☑ Target Date Reminder
None repeated Once

☑ Response Due
7/24/2005

☑ Target Completion
9/7/2005

Action Plan-Items (2)

| Copy ☑ | Action | Action Implemented | Instructions | Target Date |
|---|---|---|---|---|
| ☑ | A | Person A | Analyze changes in the database... | 9/7/2005 |
| ☑ | B | Person B | Write specifications for program... | 9/7/2005 |

☑ Attachments (1)

| Attachment Name | File Name | File Type |
|---|---|---|
| ND opt-out FAQ | http://www.nd.gov/FAQ/opt-out.html | URL |

☑ Observers (1)

| Observer |
|---|
| Person H |

Date Options

Copy Date values from master issue:
- ⊙ exactly as they appear in the master
- ○ exactly as they appear, shifted by [30] days
- ○ exactly as they appear, shifted relative to [7/20/2005] 📅

Note: Response and Target Dates will be set Today's date if older.

[Duplicate] [Back]

FIG. 18

```
                Issues   Utilities   Preferences   Reports   Help   Logout
  View Action
```

Issue No. 05-07041 Project-No.2-Action A

[Edit Action] [Back]

Action Implementer
Person A

Status
● Awaiting Acknowledgement

Instructions
Analyze changes in the database necessary to record "opt in" status of ND residents.

| | |
|---|---|
| Response Due | Response Date Reminder |
| 7/24/2005 | repeated |
| Target Completion | Target Date Reminder |
| 9/7/2005 | repeated |

Attachments (0)
No Attachments

Implementation Notes
No Implementation Notes

Add Note
[                    ]
[Save Note]

Journal
[Show Journal]

Audit Field Information

| Created By | Created On | Modified By | Modified On |
|---|---|---|---|
| Person A | 7/19/2005 6:47:01 AM | Person A | 7/19/2005 6:47:01 AM |

[Edit Action] [Back]

Issue No. 05-07041-Project No.2-Action A

[Save/Return] [Save] [Cancel Issue] [View Issue] [Send Assignments] [Back]

Action Implementer
[Person B ▼]

Status
○ Awaiting Acknowledgement        ○ Complete

Issue Details

Analyze changes in the database necessary to record "opt in" status of ND residents.

☐ HTML Mode

Response Due              Response Date Reminder
[7/24/2005] [12]              [None ▼] repeated [Once ▼]

Target Completion         Target Date Reminder
[7/24/2005] [12]              [None ▼] repeated [Once ▼]

FIG. 20

Issues  Utilities  Preferences  Reports  Help  Logout
Duplicate Action

ⓘ Check the items that you would like to duplicate, then select the Duplicate button...

Duplicate Action-Issue No. 05-07041 Project-No.2-Action A

[Duplicate] [Back]

Action Implementers

ⓘ Each action can have one action implementer...

| Address Book | Address Group | Action Implementers |
|---|---|---|
| Person A<br>Person B<br>Person C<br>Person D<br>Person E<br>Person F | All Users ✓<br>[Add ⇒]<br>[⇐ Remove] | |

☑ Instructions
Analyze changes in the database necessary to record "opt in" status of ND residents.

☑ Response Due
7/24/2005

☑ Response Date Reminder
None repeated Once

☑ Target Completion
9/7/2005

☑ Target Date Reminder
None repeated Once

☑ Attachments (0)
No Attachments

Date Options

Copy Date values form master Issue:
◉ exactly as they appear in the master
○ exactly as they appear, shifted by [30] days
○ exactly as they appear, shifted relative to [7/20/2005] [12]

Note: Response and Target Dates will be set to Today's date if older.

[Duplicate] [Back]

Login
Acknowledge Project

⚠ You have been assigned to a project as an Action Implementer...

Issue No. 05-07041-Acknowledge

| Issue Owner | Status | Priority |
|---|---|---|
| Person A | Open | High |

| Enacted Date | Effective Date | Compliance date |
|---|---|---|
| 7/19/2005 | 9/2/2005 | 9/17/2005 |

Source
Capital action

Jurisdictions
North Dakota

Citations
NDAC 45-14-01-01 et al

Overview
North Dakota's "opt out" provisions...

Issue Details
As of 7/19/2005, nonpublic personal information, no matter where it was collected...

Categories
All
External Issue, Internal Issue, Long Term Care, P&C, Privacy

Businesses
All
Annuities, Corporate, Life, Property & Casualty, Term Life

Departments
All
Compliance, Information Systems, Legal, P&C, Sales & Marketing

Products
All
Annuities, Commercial Auto, Commercial Excess, Inland Marine, Life

| Project Manager | Target Completion Date | Project Status |
|---|---|---|
| Person B | 9/7/2005 | In Process |

Project Description
Change the control of our current privacy notices and contracts to reflect this change

FIG. 22B

| ↘ Issue Attachments (1) | | | ⑦ |
|---|---|---|---|
| Attachment Name | File Name | File Type | |
| ND Consumer Privacy Regulation 45-15 | ND Consumer Privacy Regulation 45-15.doc | MSWORD | |

| ↘ Project Attachments (0) | ⑦ |
|---|---|
| No Attachments | |

Actions (1)

| Action | Action | % | Jurisdictions | Target Date | Completion | Status | 🗋 |
|---|---|---|---|---|---|---|---|
| | Person G | ● | Please verify that our employee training program covers this change | 7/23/2005 | N/A | Awaiting Acknow.. | |

| Notes | ⑦ |
|---|---|
| No Notes | |

Acknowledgement

Response:  ○ Action Required
 ○ No Action Required (Comment Required)
 ○ Not My Responsibility (Comment Required)

Comments: [                    ]

I acknowledge that I have reviewed this project and selected the appropriate response for the issue.

[Acknowledge]

FIG. 23

Activity Report  Issues  Utilities  Preferences  Reports  Help  Logout

Activity Report

Start Date  End Date
12/01/2005 [12]  12/31/2005 [12]

Included Reports ☑ All
☑ Cummulative Report  ☑ Priority  ☑ Departments
☑ Issue Creator  ☑ Businesses  ☑ Jurisdictions
☑ Issue Owner  ☑ Categories  ☑ Products Output Type
[Adobe PDF Document ▸]

[Create Report]  [Reset]

go to FIG 24B

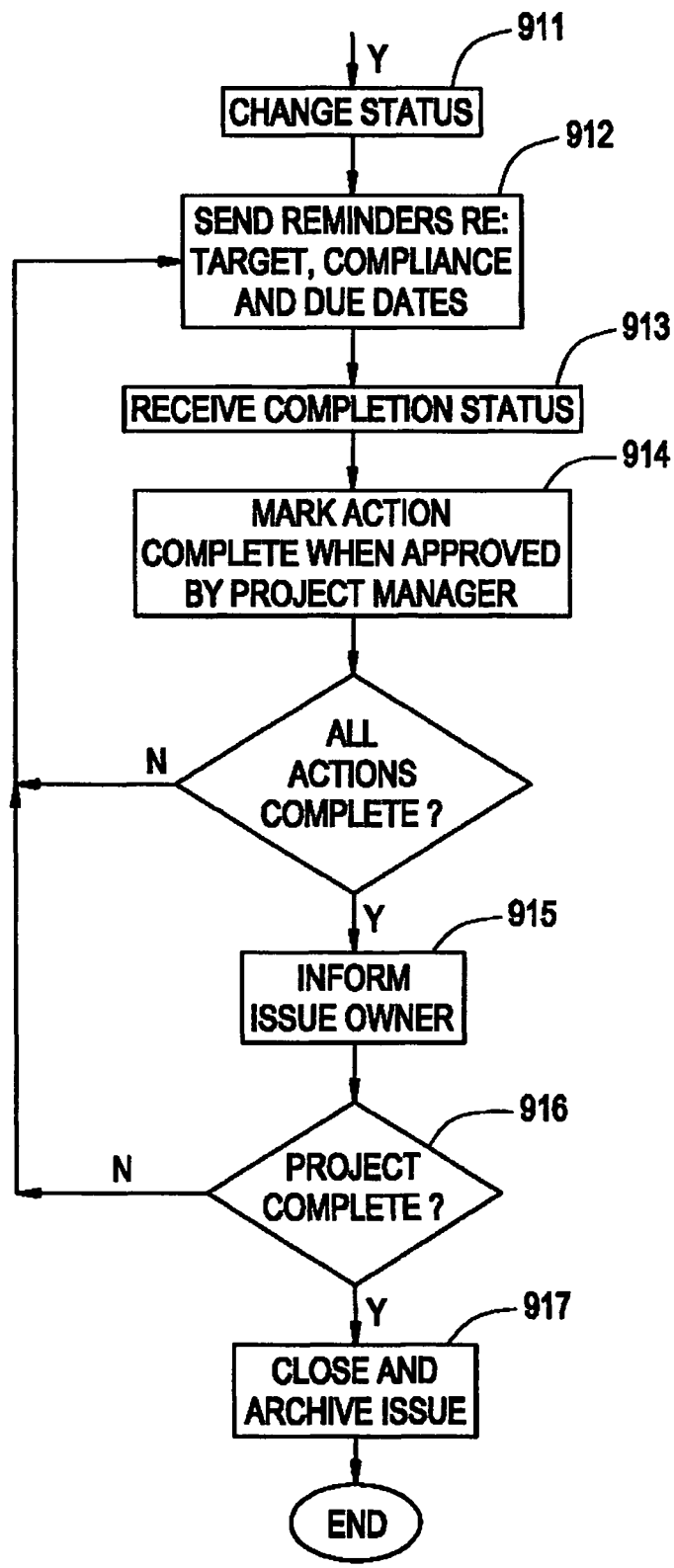

METHOD AND SYSTEM FOR MONITORING AN ISSUE

CROSS-REFERENCE TO RELATED APPLICATIONS

The present application claims priority from U.S. Patent Provisional Applications No. 60/616,644, filed Oct. 8, 2004, and No. 60/714,825, filed Sep. 8, 2005, the contents of which are herein incorporated by reference in their entirety.

BACKGROUND OF THE INVENTION

1. Field of the Invention

The present invention relates to monitoring an issue (i.e., regulatory or otherwise) implementation process using a web-based software application.

2. Detailed Description of the Related Art

Monitoring regulatory, contract, budgeting, and legal issues, etc., has been previously a labor and paper intensive process, with individuals assigned to such activities having to look up the regulations, contracts, case law etc., calendar target or compliance dates, and attempt to manage and track tasks performed by a number of individuals, related to achieving a certain target—for example, compliance with the regulations. This labor and intensive process inherently has inaccuracies which could lead to missed target dates. Accordingly, a comprehensive, accurate way to determine what issues are of importance to a company, and to monitor the activities related to achieving the targets of the issues, is desired.

SUMMARY OF THE INVENTION

The present invention relates to a web-based software application designed to monitor an issue implementation process.

In one embodiment consistent with the present invention, a method of monitoring an issue using a computerized network, includes receiving information from a user on the issue to be monitored; receiving information from a user on an assignment on the issue; and forwarding the assignment to a recipient.

In another embodiment consistent with the present invention, the method includes receiving an acknowledgement from the recipient, of the assignment.

In yet another embodiment consistent with the present invention, the method further includes sending reminders to the recipient when the acknowledgement is not received within a predetermined time period.

In yet another embodiment consistent with the present invention, the reminders are automatically forwarded at predetermined time periods.

In yet another embodiment consistent with the present invention, the assignment is one of a project and an action assignment.

In yet another embodiment consistent with the present invention, the method further includes receiving a completion status from the recipient; and displaying the completion status of the issue.

In yet another embodiment consistent with the present invention, the method further includes creating another at least one of issue, project, and action, by duplication.

In yet another embodiment consistent with the present invention, the method further includes generating a report showing activity on at least one issue over a predetermined period of time.

In yet another embodiment consistent with the present invention, the method of providing information on an issue using a computerized network, includes receiving information from a user on the issue; and forwarding the information to a recipient on the issue; wherein when action is necessary to be performed, an assignment is forwarded to the recipient; and wherein when action is not necessary to be performed, the information is forwarded to the recipient for informational purposes only.

In yet another embodiment consistent with the present invention, a method of monitoring an issue using a computerized network, includes receiving information on a plurality of issues; storing information on the issues; filtering the issues according to predetermined criteria set by a user, and displaying the issues which meet the predetermined criteria.

In yet another embodiment consistent with the present invention, a method of monitoring an issue using a computerized network, includes receiving information on a plurality of issues; storing information on the issues; sorting the issues according to predetermined criteria set by a user, and displaying the issues which meet the predetermined criteria.

In yet another embodiment consistent with the present invention, a computer system having a program which monitors an issue, includes means for receiving information from a user on the issue to be monitored; means for receiving information from a user on an assignment on the issue; and means for forwarding the assignment to a recipient.

In yet another embodiment consistent with the present invention, a computer system having a program which provides information on an issue, includes means for receiving information from a user on the issue; and means for forwarding the information to a recipient on the issue; wherein when action is necessary to be performed, an assignment is forwarded to the recipient; and wherein when action is not necessary to be performed, the information is forwarded to the recipient for informational purposes only.

In yet another embodiment consistent with the present invention, a computer system having a program which monitors an issue, includes means for receiving information on a plurality of issues; means for storing information on the issues; means for filtering the issues according to predetermined criteria set by the user, and means for displaying the issues which meet the predetermined criteria.

In yet another embodiment consistent with the present invention, a computer system having a program which monitors an issue, includes means for receiving information on issues; means for storing information on the issues; means for sorting the issues according to predetermined criteria set by a user, and means for displaying the issues which meet the predetermined criteria.

In yet another embodiment consistent with the present invention, a computer system for monitoring an issue, includes at least one memory containing at least one program including the steps of: receiving information from a user on the issue to be monitored; receiving information from a user on an assignment on the issue; and forwarding the assignment to a recipient; and at least one processor for running the program.

In yet another embodiment consistent with the present invention, a computer system for monitoring an issue, includes at least one memory containing at least one program including the steps of: receiving information from a user on the issue; forwarding the information to a recipient on the issue; and monitoring a progress of completion of the issue; and at least one processor for running the program.

In yet another embodiment consistent with the present invention, a computer system for monitoring an issue, includes at least one memory containing at least one program including the steps of: receiving information on a plurality of issues; storing information on the issues; filtering the issues according to predetermined criteria; and displaying the issues which meet the predetermined criteria; and at least one processor for running the program.

In yet another embodiment consistent with the present invention, a computer system for monitoring an issue, includes at least one memory containing at least one program including the steps of: receiving information on a plurality of issues; storing information on the issues; sorting the regulatory issues according to predetermined criteria set by a user, and displaying the issues which meet the predetermined criteria; and at least one processor for running the program.

In yet another embodiment consistent with the present invention, a computer-readable medium whose contents cause a computer system to monitor an issue, the computer system having a program includes the steps of: receiving information from a user on the issue to be monitored; receiving information from a user on an assignment on the issue; and forwarding the assignment to a recipient.

In yet another embodiment consistent with the present invention, a computer-readable medium whose contents cause a computer system to monitor an issue, the computer system having a program includes the steps of: receiving information from a user on the issue; forwarding the information to a recipient on the issue; and monitoring a progress of completion of the issue.

In yet another embodiment consistent with the present invention, a computer-readable medium whose contents cause a computer system to monitor an issue, the computer system having a program includes the steps of: receiving information on a plurality of issues;

storing information on the issues; filtering the issues according to predetermined criteria set by a user, and displaying the issues which meet the predetermined criteria.

In yet another embodiment consistent with the present invention, a computer-readable medium whose contents cause a computer system to monitor an issue, the computer system having a program includes the steps of: receiving information on a plurality of issues; storing information on the issues; sorting the issues according to predetermined criteria set by a user, and displaying the issues which meet the predetermined criteria.

In yet another embodiment consistent with the present invention, an apparatus for monitoring an issue, includes a storage device which stores information on issues; a monitoring module which monitors at least one of the issues identified by a user from the information; and a display which displays the information on the issues in a format such that a user can view the issue and monitor completion of the issue.

In yet another embodiment consistent with the present invention, a method of generating a GUI screen for monitoring an issue, includes displaying on a screen, at least one issue to be monitored, including information on the issue, such that a user can view the issue and monitor completion of the issue; wherein the information includes at least one of general information on the issue, issue details, classifications of the issue, attachments, observers, notes, a journal, and an audit field.

In yet another embodiment consistent with the present invention, a computer system having a program which generates a GUI screen for monitoring an issue, includes means for displaying on a screen, at least one issue to be monitored, including information on the issue, such that a user can view the issue and monitor completion of the issue; wherein the information includes at least one of general information on the issue, issue details, classifications of the issue, attachments, observers, notes, a journal, and an audit field.

In yet another embodiment consistent with the present invention, a computer system for generating a GUI screen for monitoring an issue, includes at least one memory containing at least one program including the steps of: displaying on a screen, at least one issue to be monitored, including information on the issue, such that a user can view the issue and monitor completion of the issue; wherein the information includes at least one of general information on the issue, issue details, classifications of the issue, attachments, observers, notes, a journal, and an audit field; and at least one processor for running the program.

In yet another embodiment consistent with the present invention, a computer-readable medium whose contents cause a computer system to generate a GUI screen for monitoring an issue, the computer system having a program including the steps of: displaying on a screen, at least one issue to be monitored, including information on the issue, such that a user can view the issue and monitor completion of the issue; wherein the information includes at least one of general information on the issue, issue details, classifications of the issue, attachments, observers, notes, a journal, and an audit field.

In yet another embodiment consistent with the present invention, a method of providing information on an issue using a computerized network, includes receiving information from a user on the issue; and forwarding the information to a recipient on the issue; wherein the recipient is not required to perform any action, and the information is forwarded to the recipient for informational purposes only.

In yet another embodiment consistent with the present invention, a computer system having a program for providing information on an issue, includes means for receiving information from a user on the issue; and means for forwarding the information to a recipient on the issue; wherein the recipient is not required to perform any action, and the information is forwarded to the recipient for informational purposes only.

In yet another embodiment consistent with the present invention, a computer system for monitoring an issue, includes at least one memory containing at least one program including the steps of: receiving information from a user on the issue; and forwarding the information to a recipient on the issue; wherein the recipient is not required to perform any action, and the information is forwarded to the recipient for informational purposes only.

Finally, in yet another embodiment consistent with the present invention, a computer-readable medium whose contents cause a computer system to monitor an issue, the computer system having a program including the steps of: receiving information from a user on the issue; and forwarding the information to a recipient on the issue; wherein the recipient is not required to perform any action, and the information is forwarded to the recipient for informational purposes only.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 2 is a representative screen shot of an Issue List according to one embodiment consistent with the present invention.

FIG. 3 is a representative screen shot of an Issue Filter according to one embodiment consistent with the present invention.

FIG. 4 is a representative screen shot of a View Issue Page according to one embodiment consistent with the present invention.

FIG. 5 is a representative partial screen shot of a General Information section according to one embodiment consistent with the present invention.

FIG. 6 is a representative screen shot of an Edit Issue Page according to one embodiment consistent with the present invention.

FIG. 7 is a representative partial screen shot of a Details section according to one embodiment consistent with the present invention.

FIG. 11 is a representative partial screen shot of a Notes section according to one embodiment consistent with the present invention.

FIG. 12 is a representative partial screen shot of a journal section according to one embodiment consistent with the present invention.

FIGS. 13A and 13B are a representative screen shot of a Duplicate Issue Page according to one embodiment consistent with the present invention.

FIG. 14 is a representative partial screen shot of a Projects list according to one embodiment consistent with the present invention.

FIG. 15 is a representative screen shot of a View Project Page according to one embodiment consistent with the present invention.

FIGS. 16A and 16B are a representative screen shot of an Edit Project Page according to one embodiment consistent with the present invention.

FIG. 17 is a representative screen shot of a Duplicate Project Page according to one embodiment consistent with the present invention.

FIG. 18 is representative screen shot of a View Action Page according to one embodiment consistent with the present invention.

FIG. 19 is a representative screen shot of an Edit Action Page according to one embodiment consistent with the present invention.

FIG. 20 is a representative screen shot of a Duplicate Action Page according to one embodiment consistent with the present invention.

FIG. 21 is a representative screen shot of a Send Assignment Page according to one embodiment consistent with the present invention.

FIGS. 22A and 22B are a representative screen shot of an Acknowledge Project Page according to one embodiment consistent with the present invention.

FIG. 23 is a representative screen shot of an Activity Report Page according to one embodiment consistent with the present invention.

FIGS. 24A-B are a flow chart depicting the major steps in the tracking of a regulatory implementation process according to one embodiment consistent with the present invention.

DESCRIPTION OF THE INVENTION

The present invention relates to a method and system for tracking the implementation of a regulatory process. In particular, the present method and system provides a novel way for a centralized compliance department of a company, for example, and the department which is responsible for reviewing, assessing and overseeing the implementation of new regulatory and legislative changes, to do so easily and effectively.

System

Figure 1:
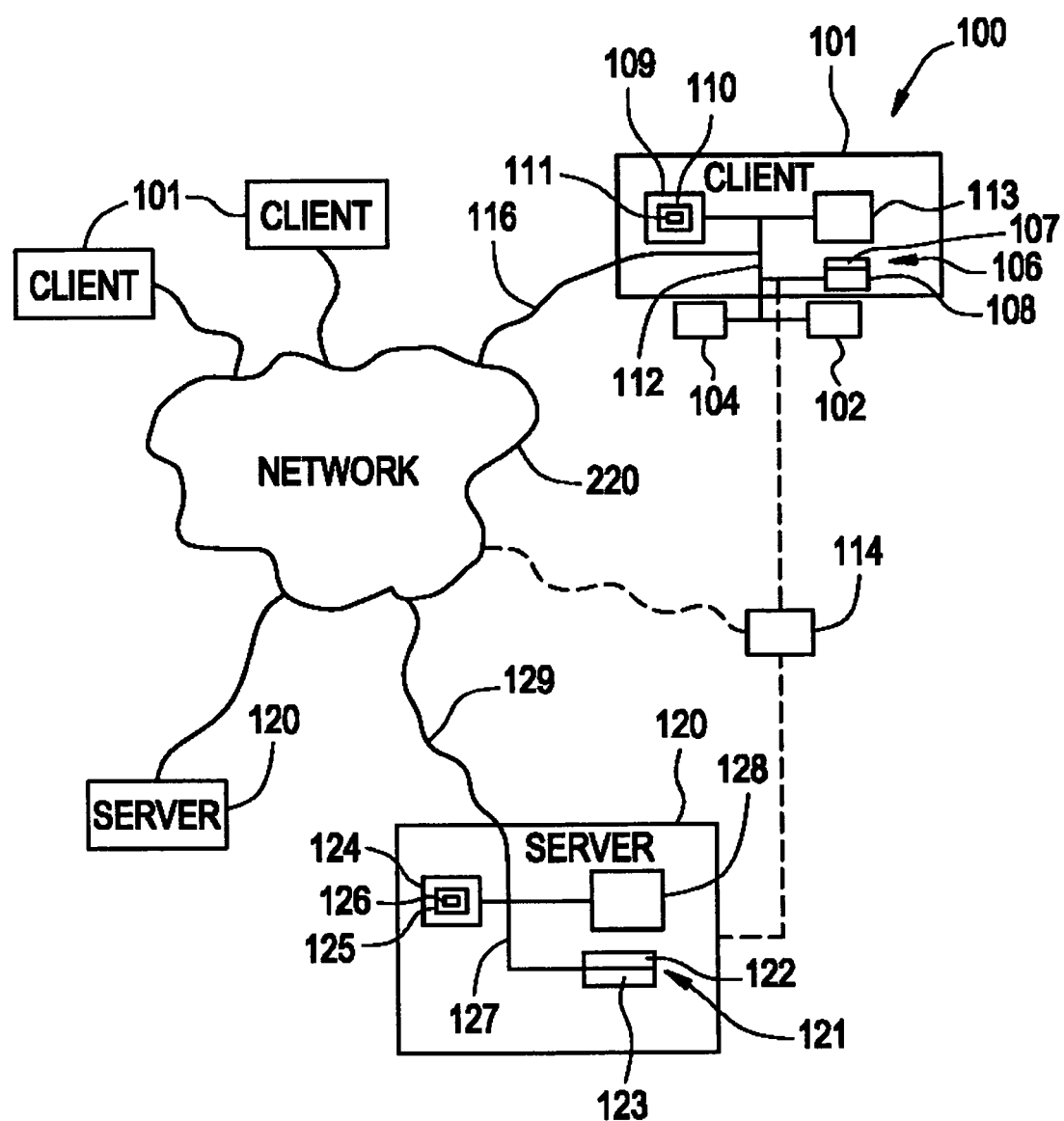
FIG. 1 is a schematic of one embodiment consistent with the present invention, showing a client-server environment and connection via the Internet.

In one embodiment consistent with the present invention, the system 100 (see FIG. 1) includes a client computer 101, such as a personal computer $(P)_q$, with display or monitor 102 and input means 104. However, the client 101 may be a mobile terminal, such as a mobile computing device, or a mobile data organizer (PDA), operated by the user accessing the program remotely from the client 101.

Methods and systems consistent with the present invention are carried out by providing an input means 104, or user selection means, including hot clickable icons etc., or selection buttons, in a menu, dialog box, or a roll-down window of an interface provided at the client 101, and the user may input commands through a programmable stylus, keyboard, mouse, speech processing means, laser pointer, touch screen, or other input means 104.

The input or selection means 104 may be constituted by a dedicated piece of hardware or its functions may be executed by code instructions executed on the client processor 106, involving the display unit 102 for displaying the selection window and a stylus or keyboard for entering a selection, for example.

The client 101 typically includes a processor 106 as a client data processing means, the processor including a central processing unit (CPU) 107 or parallel processor and an input/output (I/O) interface 108, a memory 109 with a program 110 having a data structure 111, all connected by a bus 112. Further, as stated above, the client 101 would include an input device or means 104, a display 102, and may also include one or more secondary storage devices 113. The bus 112 may be internal to the client 101 and may include an adapter to a keyboard or input device 104 or may include external connections.

The imaging display device 102 for the present invention is a high resolution computer monitor, which could also be a touch screen monitor. Alternatively, the display device 102 can also include other touch sensitive devices including tablet, pocket PC, and plasma screens. The touch screen would be pressure sensitive and responsive to the input of a stylus 104, for example, which would be used to directly interact with the display device 102.

Note that with respect to the client system 101, the graphics user interface (GUI) is a client application written to run on existing computer operating systems which may be ported to other personal computer (PC) software, personal digital assistants (PDAs), and cell phones, and any other digital device that has a screen or visual component and appropriate storage capability.

The processor 106 at the client 101 may be internal or external thereto, and executes a program 110 adapted to predetermined operations. The processor 106 has access to the memory 109 in which may be stored at least one sequence of code instructions comprising the program 110 and the data structure 111 for performing predetermined operations. The memory 109 and program 110 may be located within the client 101 or external thereto.

Note that at times the system of the present invention is described as performing a certain function. However, one of ordinary skill in the art would know that the program 110 is what is performing the function rather than the entity of the system itself.

The program 110 which runs the method and system of the present invention can include a separate program code for performing a desired operation, or may be a plurality of modules performing sub-operations of an operation, or may be part of a single module of a larger program 110 providing the operation. For example, the program 110 or a portion thereof, can be defined as a monitoring module.

The processor 106 may be adapted to access and/or execute a plurality of programs 110 corresponding to a plurality of operations. An operation rendered by the program 110 may be, for example, supporting the user interface, performing e-mail applications, etc.

The data structure 111 may include a plurality of entries, each entry including at least a first storage area that stores the databases or libraries of image files, for example. The data structure can also have alternative embodiments including those associated with the stored information as one of ordinary skill in the art would appreciate from the following descriptions.

The storage device 113 stores at least one data file, such as image files, text files, data files, audio, video files, etc., in providing a particular operation. The data storage device as storage means 113, may for example, be a database, including a distributed database connected via a network, for example. The database can be a computer searchable database and may be a relational database. The storage device may be connected to the server 120 and/or the client 101, either directly or through a communication network, such as a LAN or WAN. An internal storage device 113, or an external storage device 114 is optional, and data may also be received via a network and directly processed.

In methods and system consistent with the present invention, the client 101 may be connected to other clients 101 or servers 120, including administration, billing or other systems, via a communication link 116 as a client communication means, using a communication end port specified by an address or a port, and the communication link 116 may include a mobile communication link a switched circuit communication link, or may involve a network of data processing devices such as a LAN, WAN, the Internet, or combinations thereof. In particular, the communication link may be to e-mail systems, fax, telephone, wireless communications systems such as pagers and cell phones, wireless PDA's and other communication systems.

The communication link 116 may be an adapter unit capable to execute various communications protocols in order to establish and maintain communication with the server 120, for example. The communication link 116 may be constituted by a specialized piece of hardware or may be realized by a general CPU executing corresponding program instructions. The communication link 116 may be at least partially included in the processor 106 executing corresponding program instructions.

In one embodiment consistent with the present invention, if a server 120 is used in a non-distributed environment, the server 120 would include a processor 121 having a CPU 122 or parallel processor which is a server data processing means, and an I/O interface 123, but may also be constituted by a distributed CPU 122 including a plurality of individual processors 121 on one or a plurality of machines. The processor 121 of the server 120 may be a general data processing unit, but preferably a data processing unit with large resources (i.e., high processing capabilities and a large memory for storing large amounts of data).

The server 120 may include a memory 124 with program 125 having a data structure 126 all connected by a bus 127. The bus 127 or similar connection line can also consist of external connections, if the server 120 is constituted by a distributed system. The server processor 121 may have access to a storage device 128 for storing preferably large numbers of programs for providing various operations to the users.

The data structure 126 may include a plurality of entries, each entry including at least a first storage area which stores data and image files, for example, but may also have alternative embodiments including that associated with other stored information as one of ordinary skill in the art would appreciate.

The server 120 may be a single unit or may be a distributed system of a plurality of servers 120 or data processing units, and may be shared by multiple users in direct or indirect connection to each other. The server 120 performs at least one server program for a desired operation, which is required in serving a request from the client 101.

The communication link 129 from the server 120 is preferably adapted to communicate with a plurality of clients.

The present invention is implemented in software which can be provided in a client and server environment or in a distributed system over a computerized network across a number of client systems. Thus, in the present invention, a particular operation may be performed either at the client or the server, at the edge of a network or at the center, or both. Therefore, at either the client or the server, or both, corresponding programs for a desired operation/service are available.

In a client-server environment, at least one client and at least one server are each connected to a network 220 such as a Local Area Network (LAN), Wide Area Network (WAN, and/or the Internet, over a communication link 116, 129. Interaction with users may be through secure and non-secure internet connectivity. Thus, the steps in the methods consistent with the present invention are carried out at the client or at the server, or at both, the server (if used) being accessible by the client over for example, the Internet using a browser application or the like.

The client system 101 may include communications via a wireless service connection. The server system 120 may include communications with network/security features, via a wireless server, which connects to, for example, voice recognition. However, one of ordinary skill in the art would know that other systems may be included.

In another embodiment consistent with the present invention, the client system may be a basic system, and the server may include all of the components necessary to support the software platform of the present invention. Further, the present client-server system may be arranged such that the client system can operate independently of the server system, but that the server system can be optionally connected. In the former situation, additional modules would instead be connected to the client system. In another embodiment consistent with the present invention, the client system and server system can be disposed in one system, rather being separated into two systems.

Although the above physical architecture has been described above as client-side or server-side components, one of ordinary skill in the art would know that the above components of the physical architecture may be in either client or server, or in a distributed environment.

Further, although the above-described features and processing operations may be realized by dedicated hardware, or may be realized as programs including code instructions executed on data processing units, it is further possible that parts of the above sequence of operations are carried out in hardware, whereas other of the above processing operations are carried out using software.

The underlying technology allows for replication to various other sites. Each new site can maintain "state" with its neighbors so that in the event of a catastrophic failure, other server systems can continue to keep the application running, and allow the system to load-balance the application geographically as required.

Further, although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, floppy disks, CD-ROM, a carrier wave received from a network such as the Internet, or other forms of ROM or RAM either currently known or later developed. Further, although specific components of the system have been described, one skilled in the art will appreciate that the system suitable for use with the methods and systems consistent with the present invention, may contain additional or different components.

LogIn

The user gains access to the present system in one of two ways: 1) either by following a web link contained within an e-mail notification, or 2) by directly logging onto the system over the Internet. The e-mail notification is discussed further below. The direct login onto the system is performed as follows.

Once the user accesses the website of the system using a browser, the program 110 will provide a Login page, at which the user will enter the company's identification (i.e., company's web address), user name, password, and group, for example.

If the user has forgotten their password, the user can click on the link "Forgot My Password" on the login page, and the program 110 will display a prompt requesting that the user input their e-mail address. The user can enter their e-mail address and select "Send Request". Once inputted, the program 110 will then send the user an e-mail with a link that will allow the user to reset their password. If the user has more than one user account, the program 110 will present a list of all of the user accounts that use the e-mail address that the user entered, and the user can select one or more of them to reset their password.

Issues

Once the program 110 has approved the user identification and password, the program 110 will display an "Issue" List (see FIG. 2), for example. The Issue List can also be displayed by the program, by the user selecting "Issue List" from a menu.

In one embodiment consistent with the present invention, an Issue is a requirement that demands some type of Action to be performed. When a company identifies a relevant requirement, the requirement can be added to the present system and will be referred to as an Issue. The Issue describes the statute, regulation, agency bulletin, case law, contract, budget, or other item which must be review or acted upon. Compliance or project/issue target dates, internal Target dates, and Attachments are also part of the Issue. The Action associated with an Issue may be as simple as distributing a new list of operating procedures to a single department or as complex as integrating a far reaching change throughout the organization, for example.

Although the present invention will mainly be described with respect to compliance and regulatory issues, it would be clear to one of ordinary skill in the art, that the present invention is also directed to monitoring Issues, Projects, Actions and Assignments in a variety of other areas, such as financial (i.e., budgets) areas, government contracts, case law etc.

In one exemplary embodiment related to the regulatory implementation process, for example, there are two types of Issues that can be created in the present system. The first is a Standard Issue (referred to simply as an Issue) which is intended to track an existing compliance requirement. The second type of Issue is an FYI Issue which is intended as a mechanism to inform individuals in the organization about a proposed or pending compliance requirement.

If a user has Issue Administrator rights, all Issues are displayed in the Issue List by the program 110. If not, then only those Issues in which the user is involved in any role will be displayed by the program 110 to that user (i.e., as an issue observer, action implementer, issue owner).

The Issue List (see FIG. 2) can be sorted by the program 110 by the user clicking on a sortable column header (see FIG. 3). Sortable column headers are underlined, and include the Issue No., Priority, Citation, Compliance date, Date Created, Issue Owner, (described below) etc. In use, the  icon appears when the user moves the input means 104 over a sortable column header. The  icon indicates the sort order and the current sort column. The first time the user clicks a sort column, the information is sorted by the program 110 in ascending order. The second time the information is sorted in descending order by the program 110.

The number of pages of the Issue List is displayed by the program 110 on the screen (see FIG. 2), at the top and bottom of the grid. The user simply clicks on the page number and the program 110 will display that new page.

The Issue List provides a system generated number (created by the program 110 automatically when the Issue is created). The Issue Overview and Detailed Summary of the Issue are displayed by the program 110 when the ⓘ icon is accessed by the user. Attachments (if any) are displayed by the program 110 when the ✎ icon is accessed by the user, and the ▤ icon starts the process of duplicating an Issue.

The completion percentage % is calculated by the program 110 and displayed in the Issue List, so that the user can note the status of the completion of the Issue.

The program 110 also displays a Priority Level in the Issue List, based upon the likelihood of severity of financial or procedural impact. The Priority Levels are High, Normal, and Low.

Note that the headers, such as Categories, Jurisdictions, etc., are editable, and may be changed by the user to correspond to the terms used in each company.

The Jurisdictions header displays the areas of governance defined by the company, such as particular states, territories, or regions of the United States. Citations refers to state statutes, bills, bulletins, or other cited regulations containing the compliance information to be processed. Categories are user-defined topical classifications that specify the scope of an Issue.

The Compliance Date is established by the user as the date the company must be in compliance with the requirement, for example, or when the issue, project, or action, should be completed.

Further, an Issue Creation Date is provided, as well as the Issue Owner, who is the individual responsible for monitoring the status of the Project(s) to ensure the Issue's timely resolution.

Icons that are displayed by the program 110 in the % column of the Issue List, such as different color buttons or symbols, refer to Standard and FYI Issues, which have or do not have Projects, and inform the user as to whether those Projects are late or on-time, and whether the Issues were closed or canceled. FYI Issues can also be marked.

The Issue List can also be filtered by the program 110 to display only those Issues which meet certain criteria—i.e., Issue Owner, Jurisdiction, Categories, Status (i.e., open, closed, canceled) (see FIGS. 3-4). For example, to display only those Issues for a particular jurisdiction, the user would select the desired entry from the Jurisdiction dropdown list and then click the Filter button. The program 110 will retrieve the Issues that match the filter criteria and redisplay the Issue List with only those Issues that match the criteria specified.

To reset the filter to its default options, the user can select the Reset button, which will cause the filter options to be reset to their default values so that other filter criteria can be entered, or the default list can be displayed by the program 110. The Default Filter setting instructs the program 110 to display Issues with a current status of Open.

An Advanced Filter option (see FIG. 3) provides the user with the ability to further filter the list of displayed Issues. The Advanced Filter option instructs the program 110 to display only Issues which meet all of the specified criteria. If an Issue matches one of the criteria but not another, it will not be displayed by the program 110. If the user selects a particular Jurisdiction and a specific Department, for example, then only those Issues that meet both the Jurisdiction and the Department criteria are displayed by the program 110.

Using Advanced Filter Fields (see FIG. 3), the program 110 can filter for Jurisdictions, Categories, Departments, Issue Owner, Status, Priority, Business Units, Products, Enacted Date (the date the new legislation/regulation/bulletin, etc. is enacted/adopted/released), Effective Date (the date the new legislation/regulation/bulletin, etc. takes effect), Compliance Date (the date established by the company to be in compliance with the requirement), Issue Number, and also perform a Text Search (a case-insensitive keywords for searching the Source, Citation, Overview and Detailed Summary fields).

Specifically, with regard to Jurisdictions, company-defined geographic areas (i.e., states, territories, regions) are used for classifying issues by affected geographic area. By default, the program 110 populates the Jurisdictions with the fifty states and Washington D.C. The user can change the label of this classification to match the company's naming convention (i.e., Regions, Branches, or Territories).

With regard to Categories, the company-defined categories are used by the program 110 for classifying issues by category. For example, the user might configure Categories to represent various areas of legislation, such as Telecommunications, Privacy, Personal Property, Corporate Governance, etc. This classification can be relabeled at the user's discretion to be used to classify issues in any manner that the user wishes.

In one embodiment, company-defined departments within the organization are used for classifying Issues by affected department. This classification is used to classify Issues by the affected Department(s), but it is also used to organize users. By assigning each user to a Department, the authorized user will automatically group each user into address groups that can be easily selected within the system. The user can change the label of this classification to match the Company's naming convention (e.g., Sections, Divisions), but it will always be used to classify Issues and users.

In one embodiment, company-defined business units within the organization are used for classifying issues by affected business unit. This classification can be relabeled by the user, to classify Issues in any manner that the user wishes.

Finally, with regard to Products, the company-defined products within the organization are used for classifying issues by affected product. This classification can be relabeled by the user to classify Issues in any manner desired.

The filter and sort preferences can be saved in a storage device 113, for example, by the program 110, by selecting the ▦ icon above the filter or sort area (see FIG. 3). Selecting this icon will instruct the program 110 to save the current filter or sort options so that the user can instruct the program 110 to restore them at a later time by the user selecting the appropriate Restore Preferences icon ▦. The program 110 will store the filter and sort preferences and restore them each time the user logs-in.

Each Standard Issue (see FIG. 4) has the following major components: the General Information section 201, which contains the fundamental information about the requirement (i.e., Jurisdiction(s), Citation(s), Enacted Date, etc.), Overview, Attachments 202, Notes section 203, Journal 204, and Audit Field 205.

In addition to these sections, Standard Issues also have a Project Assignment section 206, which is a list of all Project(s) (created to address the Issue) and their current status, and an Issue Observers section 207.

Every Issue has one individual who is responsible for monitoring the status of a Project(s) to ensure its timely resolution. This individual is known as the Issue Owner. The default Issue Owner is the person who created the Issue.

A user with Issue Administrator rights can instruct the program 110 to create a new Issue by selecting the Add Issue or Add FYI Issue button on the Issue List page (see FIG. 2), by selecting the Add New or Add New FYI item from the Issues menu, or by selecting the duplicate icon ( ) for an existing Issue. When a new Issue is created, the program 110 displays the new Issue Page (see FIG. 4), and the user can enter the applicable information and click the Save or Save/Return button.

To view an Issue, the user may select the issue number link in the Issue List (see FIG. 2), and the program 110 will display the View Issue Page 200 (see FIG. 4). The View Issue Page displays Issue General Information Details 201 (such as Jurisdiction, Overview), Attachments 202, Projects 206, Observers 207, Notes 203, Journal 204, and Audit Field 205 sections.

In addition, the Issue Page can be edited by the user clicking on the Edit Issue button on the View Issue Page 200, or the  icon in the Issue List page (see FIG. 2). The program 110 will display the Edit Issue Page 300 (see FIG. 6). The Edit Issue Page 300 contains General Information 301, Details 302 (such as Jurisdiction, Citations, Overview, Issue Details), Classifications 303 (such as Categories, Businesses, Departments, and Products), Attachments 304 (see FIG. 9), Observers (see FIG. 10), Notes (see FIG. 11), Journal (see FIG. 12), and Audit Field (see FIG. 4) sections.

The Edit Issue Page 300 is similar to the View Issue Page 200, except that in the Edit Issue Page, each of the fields can be modified. Further, some of the editable data on the Edit Issue Page (i.e., Jurisdictions, Businesses, and Categories), for example, may be hidden when the page is initially displayed (see FIG. 4). To display these sections and edit the information, the user would simply click on the  icon next to that section of data and the program 110 will display these sections for user modification.

The following discusses the different sections of the View and Edit Issue Pages in more detail.

a. General Information

The General Information section (see FIGS. 4 and 6) for an Issue is entered into the system by the Issue Owner. The General Information elements are shown in FIGS. 4 and 6, and include, for example, Issue Owner, Status, Priority, Enacted Date, Effective Date, Compliance Date, Source, and, for example, the Calendar Icon  which is a tool for selecting dates.

b. Details

The Details section of the View and Edit Issue Pages contains detailed information about the legislation or regulation itself, for example, including the Jurisdictions that it applies to, the Citations, and an Overview and detailed description of the legislation (see FIG. 5). Essentially, the Details section contains detailed information about the Issue.

When the View Issue Page is initially displayed by the program 110 (see FIG. 4), some of the information is hidden. The user can view this additional information by selecting the Show/Hide Details link at the top of the page and the program 110 will show the Details.

However, in the Edit Issue Page (see FIG. 6), the Details, such as Jurisdictions, Citations, Overview (a succinct definition of the Issue), and Issue Details (a summary of the referenced citation contained in the Issue and how it may affect the organization, and which may include instructions or plans for implementing changes), are displayed by the program 110 in full.

FIGS. 5 and 7 shows the Issue Details in expanded form. Note that Compliance Date details are not displayed by the program 110 for FYI Issues.

c. Classifications

Figure 8:
FIG. 8 is a representative partial screen shot of a Classifications section according to one embodiment consistent with the present invention.

In addition to the Generation Information and Details about an Issue, each Issue can be further classified into one or more classifications using company-defined Issue attributes, such as, for example, Categories, Business Units, Departments, and Products (see FIG. 8). The user can define the elements of each of these groups and the program 110 can classify the Issues according to which elements apply to a particular Issue.

Using Classification attributes will allow the user to instruct the program 110 to filter, sort, and report on the Issues based on their classification attributes. For example, a particular user may only be interested in Issues that affect the company's Long-Term Care Division; or perhaps those that affect the IT Department and its Web-Based Software Products.

FIG. 8, for example, shows the fields that are available in the Classification section of the Edit Issue Page (i.e., Categories, Businesses, Departments, and Products).

d. Attachments

The Attachments section (see FIG. 9) includes links to documents (i.e., word processing documents, scanned documents, spreadsheets, etc.), or links to Internet web pages. The Attachments section allows the user to instruct the program 110 to add additional information to the Issue Page to assist all users in understanding and working on the Issues.

Figure 9:
FIG. 9 is a representative partial screen shot of an Attachments section according to one embodiment consistent with the present invention.
Figure 10:
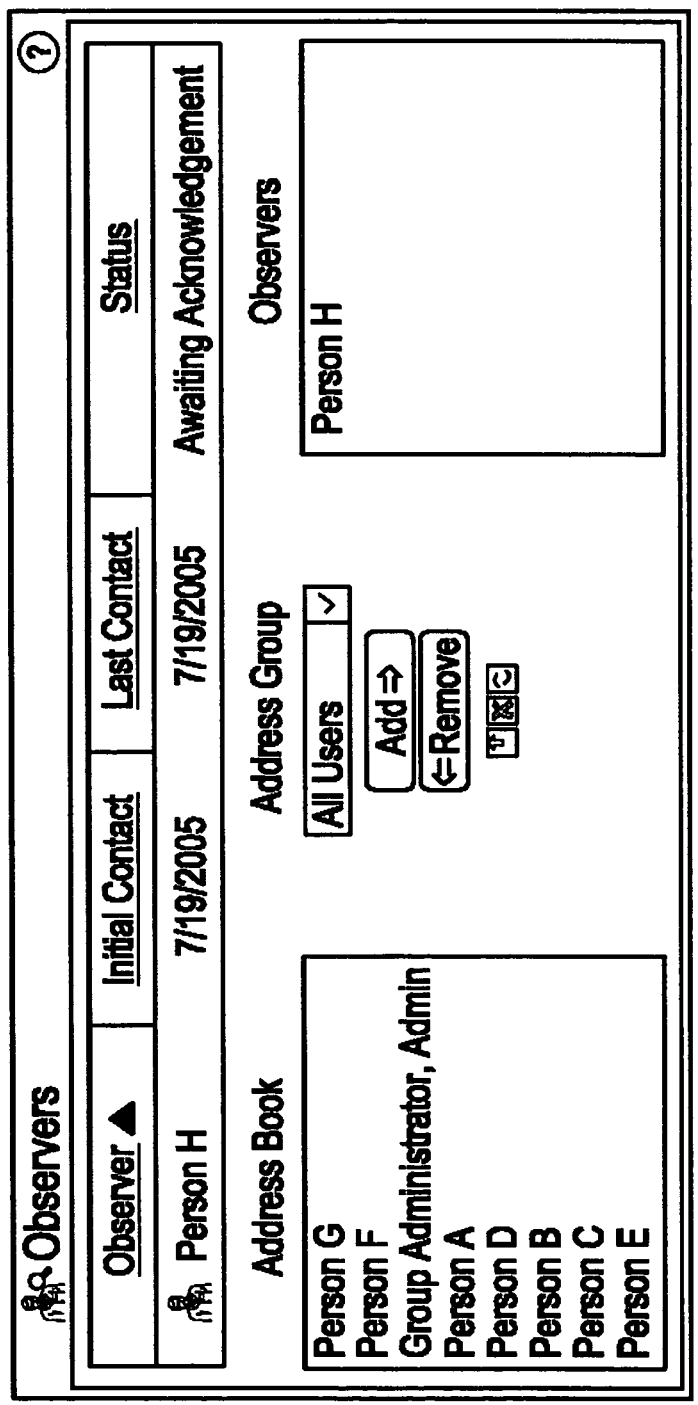
FIG. 10 is a representative partial screen shot of an Observers section according to one embodiment consistent with the present invention.

Attachments can be added by the user selecting the Add Attachment button below the Attachment table, as shown in FIG. 9. The Attachments can vary from zero to any number, and are only limited by the storage capacity of the system.

The Attachments include the Attachment Name (the user-defined name of an electronic document or web link attached to the Issue for the purpose of clarification, and background information and/or full text of the cited reference), File Name (actual file name or Internet address of the Attachment), and File Type (i.e., type of Attachment, including but not limited to, word processing document, spreadsheet, image, scanned document, text document, and URL). The Edit icon can be clicked on by the user, so that the user can make modifications to an Attachment.

e. Observers

The Observers information for an Issue is added by the user, but is not displayed by the program 110 for FYI Issues, since FYI Issues have Recipients, not Observers. Observers can be added or removed by the user, using the controls in the Observers section (see FIG. 10), at any time during the life of an issue, and the program 110 will add or remove the individuals chosen.

In the Observers section of the View and Edit Issue Pages (see FIGS. 4 and 10), the following information may be displayed by the program 110 if chosen by the user, for example: full name of Observer, Initial Contact (the date the first Issue Notification e-mail was sent to the individual; Last Contact (the date of the last e-mail Notification); and Status (status of response, such as: Not Sent, Awaiting Acknowledgement and Acknowledged).

f. Notes

The Notes section in the View and Edit Issue Pages (see FIGS. 4 and 11) provides, for example, the user a way to communicate further information about an Issue or to make comments about steps that were taken to resolve the Issue or decisions that were made during implementation.

A user adds a Note by simply typing the Note text into the Add Note box (see FIG. 11), and then clicking on the Save Note button and the program 110 will store the same. The Notes section is essentially a collection of Issue related comments.

The Notes section includes the Date the Note was added to the Issue, the Author (individual who added the Note), and the text of the Note (editable).

g. Journal

The Journal section (see FIGS. 4 and 12) contains a Journal of events that occur in the life of an Issue, for example (i.e., change in status (i.e., opened, closed), when an issue is sent, etc.). Journaling may be performed at the Issue, Project, and Action levels, and may be displayed by the program 110 independently in the Issue, Project, or Action views (see FIG. 4). Journaling events are recorded by the program 110 and are not editable by the user. The Journal is not displayed by the program 110 by default, but can be displayed by the program 110 by the user clicking the Show Journal button in the Journal section of the View Issue Page or Edit Issue Page, for example (see FIGS. 4 and 12).

The Journal section includes the date and time the event took place, the user that initiated the event, the Event (i.e., Issue owner changed, the Issue status changed, the Issue compliance reminder sent (Standard only), Project deleted (Standard only, Issue sent (FYI only), Issue visited by recipient (FYI only), Issue acknowledged by recipient (FYI only)), and the Description of the Event that took place.

h. Audit Field

The Audit Field section displays basic Audit information generated by the program 110 and can not be modified (see FIG. 4). The Audit Field section provides information on the user who created the Issue, the date the Issue was created, the user who last modified the Issue, and the date the Issue was last modified.

i. FYI Issue

In an FYI Issue, the Recipients Section of the Edit Issue Page is similar to the Observers section, except that with FYI Issues, there are no Observers—simply Recipients, and there are no Projects. The Recipients are the individual users that an FYI Issue are sent to by the program 110, and are not displayed for Standard Issues—only FYI Issues. Recipients can be added or removed by the program 110 by the user selecting the appropriate controls in the Recipients section of the Edit Issue Page.

The Recipients section includes the name of the recipient, the initial contact (i.e., the first time this FYI Issue was sent to the recipient), last contact (i.e., the last time this FYI Issue was sent to the recipient), and the status (the recipient's status, such as Not Sent, Awaiting Acknowledgement, Acknowledged).

There are two methods of sending FYI Issues—1) sending the FYI issue with an expected acknowledgement, and 2) sending it and closing the issue. In the latter case, the Issue is closed by the program 110 immediately after sending it to the FYI Recipient, and the FYI Recipient is not required to acknowledge the Issue.

The Edit Issue Page allows the program 110 to perform a number of functions, such as saving the changes to the Issue, saving the changes to the Issue and returning to the Issue List page, canceling the Issue, viewing the current Issue (no editing allowed), sending an Assignment associated with the Issue (discussed further below), and returning to the Issue List Page, for example.

In addition, when an Issue is no longer needed, even though the Issue may not be completed or ready to be closed, a Cancel Issue button on the Edit Issue Page (see FIG. 6) can be clicked by the user and the program 110 will cancel the Issue. When an Issue is canceled, the program 110 will no longer send reminders for the Issue and the Issue will only appear on the Issue List if the user selects All or Canceled in the Status filter. If the Issue needs to be reopened at any time, the user can select the Open button on the Edit Issue Page, and the Issue will be reopened by the program 110.

The program 110 will display canceled Issues for archival purposes, although in another embodiment consistent with the present invention, the Issue may also be deleted from the system.

j. Duplicate Issues

Figure 13B:

The program 110 of the present invention also provides a method of creating a new Issue that is similar to an existing Issue—which is the duplicate (📋) feature. When an Issue is selected for duplication, the program 110 will display the Duplicate Issue Page (see FIGS. 13A and 13B), which will allow the user to customize the new Issue that will be created by duplication.

The user can select which data elements they wish to duplicate, for example, by selecting the checkboxes next to the data elements the user wishes to include in the new Issue. For example, the user may wish to copy the Projects and the Businesses, but not wish to copy the dates, since the new Issue will have different dates. Or, in another example, the user may wish to copy the dates, but shift them by a number of weeks. The Options at the bottom of the Duplicate Issue Page adjusts the dates for the new Issue.

When all the selections have been made, the user simply clicks the Duplicate button, and the program 110 will create a new Issue in accordance with the selections made.

Projects

One of the novel features of the present invention is the Project capability. A Project is an objective that must be realized in order to comply with the Issue requirement. The program 110 may create one Project for every required objective. Usually a Project consists of those activities which can be performed by a single Department/Business Unit, for example. So in general, if multiple Departments/Business Units are involved, an Issue will contain multiple Projects.

A Project is normally comprised of Action Items that make up the Action Plan for the completion of the Project, although a Project does not have to have an Action Plan.

Every Project has a single individual who is ultimately responsible for its resolution, known as the Project Manager. An Action is assigned to a single person who is responsible for performing the task within a specified time period. This person is referred to as the Action Implementer.

The program 110 allows for the selection of more than one Project Manager for the Project(s). This is performed by Duplication (similar to Issue Duplication above), whereby selecting more than one Project Manager, the program 110 creates multiple copies of the same Project, each with a different Project Manager.

The fields that are displayed by the program 110 on the Projects section of the Edit Issue Page (see FIG. 4), include Project No. (provided sequentially by the program 110), Action (lettered sequentially within a Project), % (percent complete or an icon indicating status), Description (of the objective to be accomplished), Status, Target Response Creation, and Manager/Implementer.

Status indicates the current status of the Project or Action (i.e., Not Sent, Awaiting Acknowledgement, In Process, Ready for Approval, and Complete).

In one embodiment, a list of Project/Action percent complete icons include differently colored buttons, symbols, and icons, which provide the information that an Action has not been sent or is awaiting Acknowledgement, or a Project that has no Actions, is on-time or late, has or has not been sent, is awaiting Acknowledgement, that is Ready for Approval, that is a percentage amount complete, or is complete Target Response Creation includes, for example: Target—date by which the Project or Action is to be completed; Response—date by which an acknowledgement or response is due; and Creation—date the Project or Action was created.

To add a new Project or Projects, the Issue Owner/user would simply click the Add Projects button in the Projects section of the Edit Issue Page, or the duplicate icon (🖹), and the program 110 will open the New Project screen where the user can create a new Project or multiple new Projects simultaneously.

Creating a new Project is very similar to editing a Project. The user selects a Project Manager, enters the Project description and Project due dates, selects Observers (if any), and saves the Project(s) and sends it to the Project Manager. To select a Project Manager(s), the user simply clicks on one or more names in the Address Book and clicks the Add button.

The Projects section (see FIG. 14) of the View Issue Page and Edit Issue Page, displays a list of all Projects and Action Items associated with the Issue. To view a Project, the user selects a Project number link in the Project section of the Issue Edit or View Issue Page, and the program 110 will display the View Project Page (see FIG. 15). Note that Projects are displayed with Standard Issues only, since FYI Issues do not have Projects associated with them.

The View Project Page (see FIG. 15) displays a General Information section 401, Project Date Section 402, Attachments section 403, Action Items section 404, Observers section 405, Notes section 406, Journal section 407, and Audit Field section 408.

The Edit Project Page 500 (see FIGS. 16A and 16B) can be accessed by the user clicking on the Edit Project button on the View Project Page 400 (see FIG. 15) or the icon 🖹 in the Issue List page (see FIG. 2). The Edit Project Page 500 contains the General Project Information 501, the Dates section 502, links to the Attachments 503, Action Plan section 504, Observers section 505, Project Notes section 506, Journal section 507, and Audit Field section 508. The program 110 will then display the Edit Project Page (see FIGS. 16A and 16B), which is identical to the View Project Page (see FIG. 15), except that on the Edit Issue Page, each of the fields can be modified.

The Edit Project Page allows the program 110 to perform a number of functions, such as saving the changes to the Project, saving the changes to the Project and returning to the Issue List page, canceling the Project, viewing the current Project (no editing allowed), sending an Assignment associated with the Project (discussed further below), and returning to the Issue List Page.

The following discusses the different sections of the View and Edit Project Pages in more detail.

a. General Information

The Issue Owner/user should provide the General Information 501 elements of the Project. This information should include the name of the Project Manager, the Status (i.e., Not Sent, Awaiting Acknowledgement, In Process, Ready for Approval, and Complete), and a Description of the Project to be completed.

b. Dates

The Dates section 502 includes date information on a Project added by the Issue Owner. The date elements may include, for example, the Response Due (date indicating when an Acknowledgement of the Project Assignment is due), Response Date Reminder (date when a scheduled auto-reminder email goes out for acknowledgement of the Project), Target Completion (date indicating when the Project is to be completed), and Target Date Reminder (a scheduled auto-reminder for completion of the Project). The program 110 can be set to send reminder e-mails at predetermined periods (i.e., for 1 day to 6 weeks) before the due date.

Response Date Reminder e-mails can also be set to be sent at a predetermined time period (i.e., for 1 day to 6 weeks) before the due date. The reminder, as well as the Target Date Reminder, can be repeated at a predetermined time (i.e., once, daily, every two days, weekly, or every 2 or 4 weeks) up to the Target Date.

c. Attachments

Each Project can have a number of Attachments (i.e., zero to any number that can be accommodated by the system). The Attachments section 503 includes links to documents (i.e., word processing documents, scanned documents, spreadsheets, etc.), or links to Internet web pages. The Attachments section allows the user to add additional information on the Action or to document what work was done to implement the Project.

As stated above with respect to Issues, Attachments can be added by selecting the Add Attachment button below the Attachment table, as shown in FIG. 9.

d. Action Plan

The Action Plan 504 information for a Project is added by the Project Manager. There is one Action Plan per Project. An Action Plan is a collection of Actions to be performed in order to fulfill the Project objective. Action Plans are discussed in greater detail below.

e. Observers

The Observers information 505 for a Project is added by the Issue Owner or Project Manager, for example. The Observer has no assigned Actions but needs to be aware of the Project objective and its current status. The Observer information is not displayed for FYI Issues, since FYI Issues have Recipients, not Observers. Observers can be added or removed by the user, using the controls in the Observers section (see FIGS. 16A and 16B).

In the Observers section of the View and Edit Issue Pages (see FIG. 4), the following information is provided: full name of Observer, Initial Contact (the date the first Issue Notification e-mail was sent to the individual; Last Contact (the date of the last e-mail Notification); and Status (status of response, such as: Not Sent, Awaiting Acknowledgement and Acknowledged).

f. Notes

The Notes section 506 displays a list of all Project related notes, for example. Notes can be entered by the Issue Owner, Project Manager, and/or Observers. Notes can be used to communicate further information about a Project or to make comments about steps that were taken to resolve the Project or decisions that were made during implementation.

A user adds a Note by simply typing the Note text into the Add Note box (see FIGS. 16A and 16B), and then clicking on the Save Note button.

The Notes section includes the Date the Note was added to the Issue, the Author (individual who added the Note), and the text of the Note (editable).

g. Journal

The Journal section 507 contains a Journal of events that occur in the life of a Project, for example (i.e., change in status (i.e., opened, closed), when an issue is sent, etc.). Journaling is performed at the Project and Action levels, and can be viewed independently in the Project or Action views (see FIGS. 16A and 16B). Journaling events are recorded by the program 110 and are not editable by the user. The Journal is not displayed by default, but can be displayed by clicking the Show Journal button in the Journal section of the View Project Page or Edit Project Page (see FIGS. 15 and 16A-B).

The Journal section 507 includes the date and time the event took place, the User that initiated the event, the Event (i.e., Action Item deleted, Project status changed, Project Assignment sent, Project Response Reminder sent, Project target reminder sent, Project acknowledged by Manager or Observer, Project visited by Manager or Observer, Project Manager changed, for example), and the Description of the Event that took place.

h. Audit Field

The Audit Field section 508 displays basic Audit information generated by the program 110 and can not be modified (see FIGS. 16A-B). The Audit Field section on the View Project Page or Edit Project Page (see FIGS. 15 and 16A-B), provides information on the user who created the Issue, the date the Issue was created, the user who last modified the Issue, and the date the Issue was last modified, for example.

After a Project is created, the Issue Owner can save the new Project, or save and return to the Issue List. Once the Project is created, the user can instruct the program 110 to send an Assignment Notification e-mail to the involved individuals (or in another embodiment, e-mails may be sent automatically). The e-mail contains a web link to the Project Acknowledgement page (discussed below).

To send the Projects and associated Action Items for an Issue, the user would simply click the Send Assignments button (discussed further below) in the Projects section. The program 110 will display the Send Assignments Page and the user will be able to select which users he/she wishes to send the Assignments.

When all Projects are completed, the Close button—which does not appear until all the Projects are completed—can be clicked on.

i. Duplicate Projects

As stated above, the program 110 of the present invention also provides a method of creating a new Project that is similar to an existing Project, which is the duplicate (▣) feature. When a Project is selected for duplication, the program 110 will display the Duplicate Project Page (see FIG. 17), which will allow the user to customize the new Project that they will create by duplication.

In a duplicated Project, the user can also select which data elements the user wishes to duplicate by selecting the checkboxes next to the data elements the user wishes to include in the new Project(s). For example, the user may wish to copy the Action Plan and Observers, but not the dates, because the new Project will have different dates. Or, in another example, the user may wish to copy the dates, but shift them by a number of weeks. The Options at the bottom of the Duplicate Project Page adjust the dates for the new Project(s).

When all the selections have been made, the user simply clicks the Duplicate button, and the program 110 will create a new Project in accordance with the selections made.

Action Plans

Each Project has an Action Plan which is a collection of Action Items to be performed in order to fulfill the Project objective.

The Action Plan of the Edit Project Page includes the Action No. (labeled with letters, for example, sequentially within a Project), Action Implementer, %, Instructions (includes specific details about a task to be completed), Target Date (date when an Action is to be completed), Completion Date (date the Action was actually completed), and Status (Not Sent, Awaiting Acknowledgment, In Process, Ready for Approval, and Complete).

A new Action Item can be created by the program 110 by the user selecting the Add Actions button on the Edit Project Page or by selecting the duplicate icon (▣) for an Action Item. Creating a new Action Item is very similar to editing an Action Item. For example, the program 110 will receive a selection of an Action Implementer, receive the Action Item instructions and due dates, and will save the Action Item and send it to the Action Implementer. If multiple Action Items are created by the program 110 that have the same or similar instructions and dates, the user can select multiple Accountable Individuals and the program 110 will create multiple Action Items, each with the same description and dates.

The user can view an Action Item by selecting the Action letter link in the Action Plan section of the Project Edit or View Project Page, and the program 110 will display the View Action Page (see FIG. 18).

The View Action Page 600 (see FIG. 18) includes a General Information section 601, a Date section 602, Attachments section 603, Implementation Notes section 604, Journal section 605, and Audit Field section 606.

The Edit Action Page 700 (see FIG. 19) can be accessed via a web link in an E-mail Notification (discussed further below), by clicking either the Action number or the ▣ icon in the Action Plan section of a Project. The Edit Action Page 700 contains the General Action Information 701, the Dates section 702, inks to the Attachments 703, Implementation Notes section 705, Journal section 706, and Audit Field section 707.

The Edit Action Page 700 (see FIG. 19) includes, for example, a Save/Return button for the program 110 to save changes to the Action and return to the Edit Project Page (see FIGS. 16A-B), a Save button for saving changes to the Action, a Send Assignment button to send the Action Assignment to selected Recipients, a Delete button to delete the Action, a View Action button to return the Action to View mode, and Back button for the program 110 to return to the Edit Project Page.

When an Action is resolved or complete, the user selects the Ready for Approval status option and clicks on the Save or the Save/Return button. The program 110 automatically sends the Project Manager an e-mail stating that the Action is complete.

a. General Information

The General Information for an Action Plan is added by the Project Manager. The General Information 601 includes the Action Implementer, Status, and Instructions, for example. The Action Implementer is the individual responsible for completion of an Action. The Status indicates the status of the Action response cycle. Status labels include, for example: Not Sent, Awaiting Acknowledgement, In Process, Ready for Approval, and Complete. The Instructions section is an area for specific instructions to be entered for completion of the Action Item.

b. Action Date Section

The Date Section 602 of the Edit Action Page is added by the Project Manager, and includes the Response Due, the Response Date Reminder, Target Completion, and the Target Date Reminder, for example.

The Response Due is the date indicating when an Acknowledgement of the Action Assignment is due. The Response Date Reminder is the date when a scheduled auto-reminder email is sent for Acknowledgement of the Action. The Target Completion is the date indicating when the Action is to be completed, and the Target Date Reminder is a scheduled auto-reminder for completion of the Action. Reminder e-mails can be set to go out at predetermined periods (i.e., for 1 day to 6 weeks) before the due date, by the program 110.

Response Date Reminder e-mails can be set to be sent at a predetermined time period (i.e., for 1 day to 6 weeks) before the due date, by the program 110. The reminder, as well as the Target Date Reminder, can be repeated at a predetermined time (i.e., once, daily, every two days, weekly, or every 2 or 4 weeks) up to the Target Date, by the program 110.

c. Attachments

Attachments 603 may be provided in the Action Plan and are handled as described above with respect to Issues and Projects.

d. Notes

The Implementation Notes section 604 displays a list of all Action related notes, and is handled as described above with respect to Issue Notes and Project Notes. Notes can be entered by the Issue Owner, Project Manager, and Action Implementer, for example. Notes can be used to communicate further information about an Action or to make comments about steps that were taken to resolve the Action or decisions that were made during implementation.

e. Journal

The Journal section 605 contains a Journal of the events that occur in the life of a Project, for example (i.e., change in status (i.e., opened, closed), when an issue is sent, etc.). Journaling is performed at the Project and Action levels, and can be displayed by the program 110 independently in the Project or Action views (see FIGS. 15 and 18). Journaling events are recorded by the program 110 and are not editable by the user. The Journal is not displayed by default, but can be displayed by clicking the Show Journal button in the Journal section of the View Project Page or Edit Project Page (see FIGS. 15 and 16A-B), for example.

One feature of the Journal is that if a user receives an e-mail regarding an Issue, and uses the link in the e-mail to review the Issue but does not acknowledge it, the Journal records will record the user's accessing the link This is proof that the recipient has accessed the Issue/Project/Action Plan, for example.

Journaling is handled as described above with respect to Issues and Projects.

f. Duplicate Action Items

Creating a new Action Item that is similar to an existing Action Item is performed by using the duplicate (▤) feature (see FIG. 20 for the Duplicate Action Item Page). This feature is handled the same way as duplicating Issues and Projects is handled as described above.

Assignments

Normally, Action Item Assignments are not automatically sent, but in one embodiment consistent with the present invention, Action Item Assignments could be set up for automatic sending based upon certain criteria.

To send an Assignment, the user clicks the Send Assignment button on the Edit Action Page, and the program 110 will send the Assignment. It is the responsibility of the Issue Owner or Project Manager to send the Assignments at the appropriate time. Project and Action Item Assignments should be sent when a Project or Action Item is first created, or anytime during the implementation of the Issue that changes need to be communicated, for example.

When an Assignment is first sent to a user, they will receive a New Assignment notification by the program 110. Subsequent Assignments for the same Project will result in an Update Assignment notification being sent to the user by the program 110. A user may send an Assignment as many times as desired, and each one will result in a new e-mail by the program 110 to the addressee. If a user is assigned to more than one Action Item, they will receive an e-mail for each Action Item that they are assigned to, by the program 110.

There are several places where a user can initiate the sending of Assignments. For example, all Project and Action Item assignments for an Issue can be sent by the program 110 in a single step to all Issue Observers, Project Managers, Project Observers, and Action Implementers. The user would simply click on the Send Assignments button on the Edit Issue Page. The program 110 will display the Send Project Assignments Page with all of the Projects and Action Items available for that Issue. The list of users is organized by Project, for example.

To send all the Assignments for a specific Project, which includes all Action Implementers and Observers for the Project, the user can select the Send Assignment button on the Edit Project Page, and the program 110 will display the Send Project Assignments Page with all the Assignments for that Project.

The user may also select the Send Assignment button on any of the Action Items within a Project and the program 110 will display the Send Project Assignments Page with each of the users associated with the Project displayed. The program 110 will automatically check the Action Implementer of the Action Item that the user selects, assuming that this is addressee the user wants to send the Assignment to, but the user can select any of the other users if desired.

Another way to send Assignments for a specific Project is to select the  (e-mail) icon in the Projects section of the Issue Page or the Actions section of the Project Page. The program 110 places this icon next to any user that has been assigned to a Project, but has not yet been sent the Project Assignment.

Figure 21:
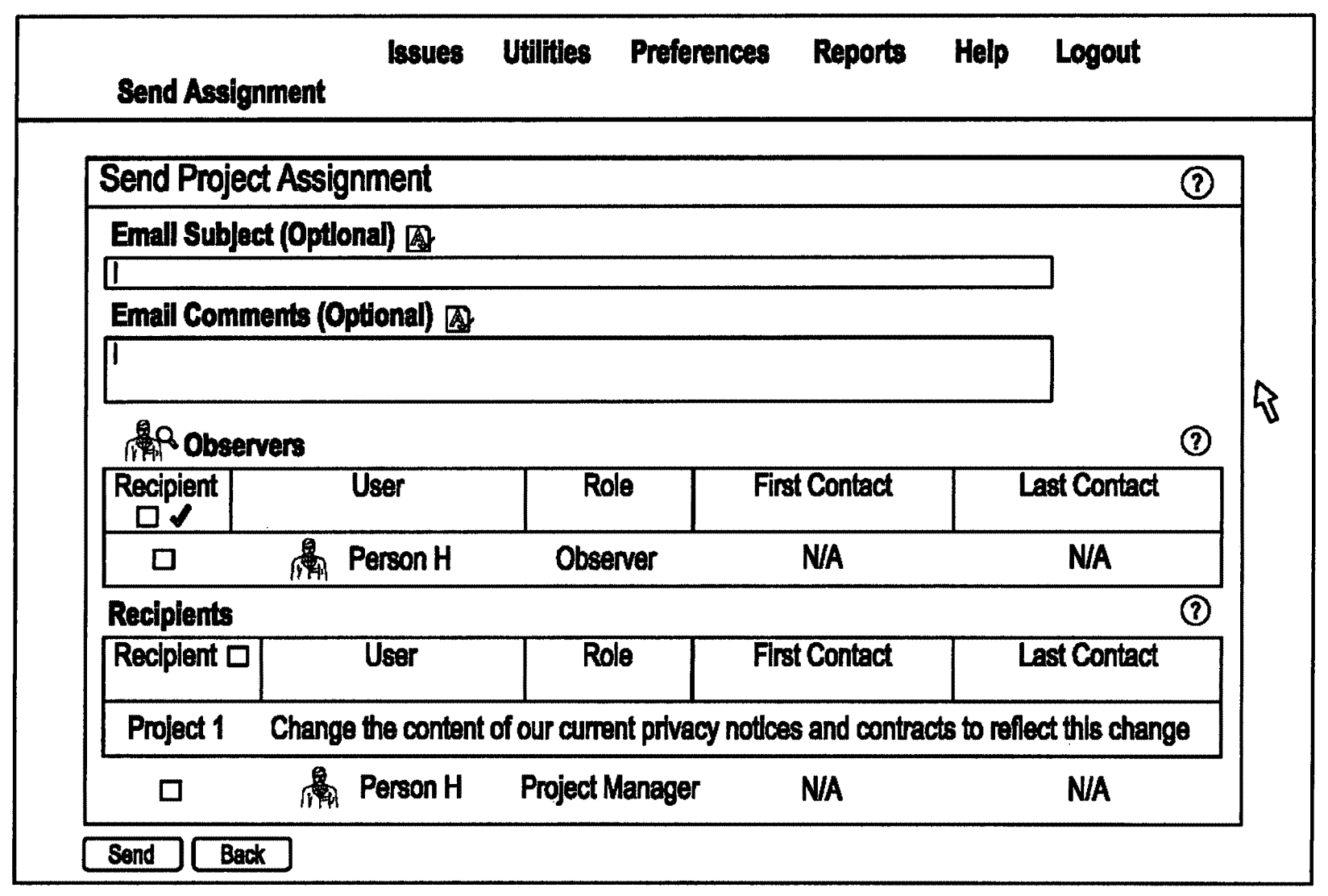

Regardless of how the user initiates the sending of Assignments, the program 110 will display the Send Projects Assignments Page (see FIGS. 21A-B). This page allows the user to specify an optional subject and text for the e-mail that will be sent to each Assignment recipient, for example. Also, the program 110 allows the user to select or de-select any users that the user does not wish to send an Assignment.

If the Send Project Assignments Page contains more than one Project, the user list will be organized by Project, by the program 110. Because users may have Assignments on more than one Project within an Issue, it is possible for a user to appear on the list more than once.

The Send Assignments fields (see FIGS. 21A-B) include the E-mail Subject (if the user does not specify a subject, the program 110 will use a default subject that contains the Issue and Project Information); E-mail Comments (text can be inserted by the user, and the program 110 will automatically append detailed information about the Issue, Project, and Action Item as appropriate in the e-mail); Recipient (a check in the box indicates which individuals are to be sent the Notification e-mail); User (recipient), Role (Recipient's role(s) within the Project; First Contact (date the Recipient was first sent an Assignment for this Project or Not Sent if they never received an Assignment); and Last Contact (date the Recipient was last sent an Assignment for this Project or Not Sent if they never received an Assignment).

Acknowledgements

Regardless of their role, each person assigned to the Project or Action item Assignment, must acknowledge the Assignment. The program 110 tracks when the Assignment was sent and when it was acknowledged by the addressee. The program 110 sends Response Reminder Notification e-mails until they are acknowledged by the addressee, if the Response Reminders are enabled by the Issue Owner.

Accordingly, the addressee will receive an E-mail Issue or Project Notification by the program 110 which provides the addressee with information on the role to be played by the addressee. The addressee should then click on the web link contained in the e-mail, and an Acknowledgement Page 800 will be displayed by the program 110 (see FIG. 22), which includes four sections of the Assignment (i.e., Issue 801, Project 802, Action 803, and Acknowledgement 804). The Acknowledgement for each type of addressee (i.e., Project Manager, Action Implementer, Project Observer, Issue Observer), has a different meaning depending on that addressee.

For example, when a Project Manager acknowledges his Assignment, the Project Manager is agreeing that he/she is responsible for the Project and will take the proper course of action. If Action is required, the Project Manager is ensuring that they will perform all the necessary tasks by the deadlines set by the Issue Owner and others.

Thus, in the present invention, the Project Manager can review the Project and select the appropriate response by selecting Action Required, No Action Required, or Not My Responsibility, and can enter any pertinent comments, for example. Then, the Project Manager can the click on the Acknowledge button (see FIG. 22) and the program 110 will acknowledge the Project.

If Action is required, the Project Manager is responsible for creating an Action Plan and instructing the program 110 to send Assignments to notify the Action Implementer(s) of their responsibilities. Thus, other individuals can be added to a Project by the user, and the program 110 will send the added individuals each an Assignment Notification e-mail. The Project Manager monitors activity, can add pertinent Notes, and resolve the Project upon completion, for example.

With respect to the Action Implementer, once the Action Implementer receives the E-Mail Notification of the Project and the Action by the program 110, he/she can follow the same procedure as the Project Manager—i.e., select the applicable response type (i.e., Action Required, No Action Required, or Not My Responsibility), enter any pertinent comments, and click on the Acknowledge button, for example. If Action is required, the Action Implementer is responsible for completing the assigned task(s) with the specified timeframe. The Action Implementer resolves the Actions when the Assignments have been completed.

The Project Observer similarly receives an E-Mail Notification from the Issue Owner or other person, and will be able to review the Project which is displayed by the program 110. However, the Project Observer is included for informational purposes only, and does not have any assigned Actions on the Project. The Project Observer adds applicable comments and monitors the progress of the Project, for example. The web link in the E-mail can be used by the Project Observer to instruct the program 110 to display the current status of the Project, and to enter Project-related comments.

The Issue Observer receives an E-mail Notification of the Issue, and can review the Issue displayed by the program 110. The Issue Observer then can click on the Acknowledge button and the program 110 will acknowledge the Issue. As with the Project Observer, the Issue Observer is included in the Issue for informational purposes only, and does not have any assigned Projects for the Issue. However, the Issue Observer can add applicable comments and monitor the progress of the Issue, for example. The Issue Observer uses the web link in the e-mail to view the current status of the Issue or to enter Issue related comments.

FYI Issue Recipients are similar to Observers in that they are made aware of the Issue by an e-mail Notification by the program 110. The FYI Issue Recipient reviews the Issue and then clicks on the Acknowledge button for the program 110 to acknowledge the Issue. The FYI Recipient is included in the Issue for informational purposes only. The FYI Recipient uses the web link in the email to view the current status of the Issue or to enter the Issue related comments.

Once Assignments are completed and the user has indicated such by locating the Assignment button and then marking the status as Ready for Approval or Complete, the Action or Project is resolved. The program 110 also automatically sends an e-mail notification to the appropriate individuals when the Assignment is marked Ready for Approval or Complete.

E-Mail Notifications

As noted above, the program 110 sends a number of e-mail notifications to the various individuals involved with the Issues. The e-mail contains a web link that, when clicked, launches the program 110 of the present invention. The page displayed depends on the type of notification.

E-mail Notifications are sent by the Issue Owner, Project Manager, Action Implementer, or can be sent by the program 110 as an automatic reminder. The typical e-mail Notifications include, among others, notifying a Recipient of their Assignment, or that they have failed to acknowledge an Assignment, that the Recipient needs to review the Issue or Project information, a Project update, notify of a person being made an Observer, or provides a means for the Recipient to acknowledge an Assignment or Action, or that the Project or Action is complete. In particular, the program 110 can send automatic reminders to individuals to acknowledge an Assignment, notify of a compliance date, etc.

Reports

Issue Activity Reports can be generated by the program 110, to show the Issue activity for a specified period of time. They can be run for Product, Issue Creator, Issue Owner, Priority, Business, Category, Department, and Jurisdiction, for example, among others. Output formats can be specified by the user.

Figure 24A:
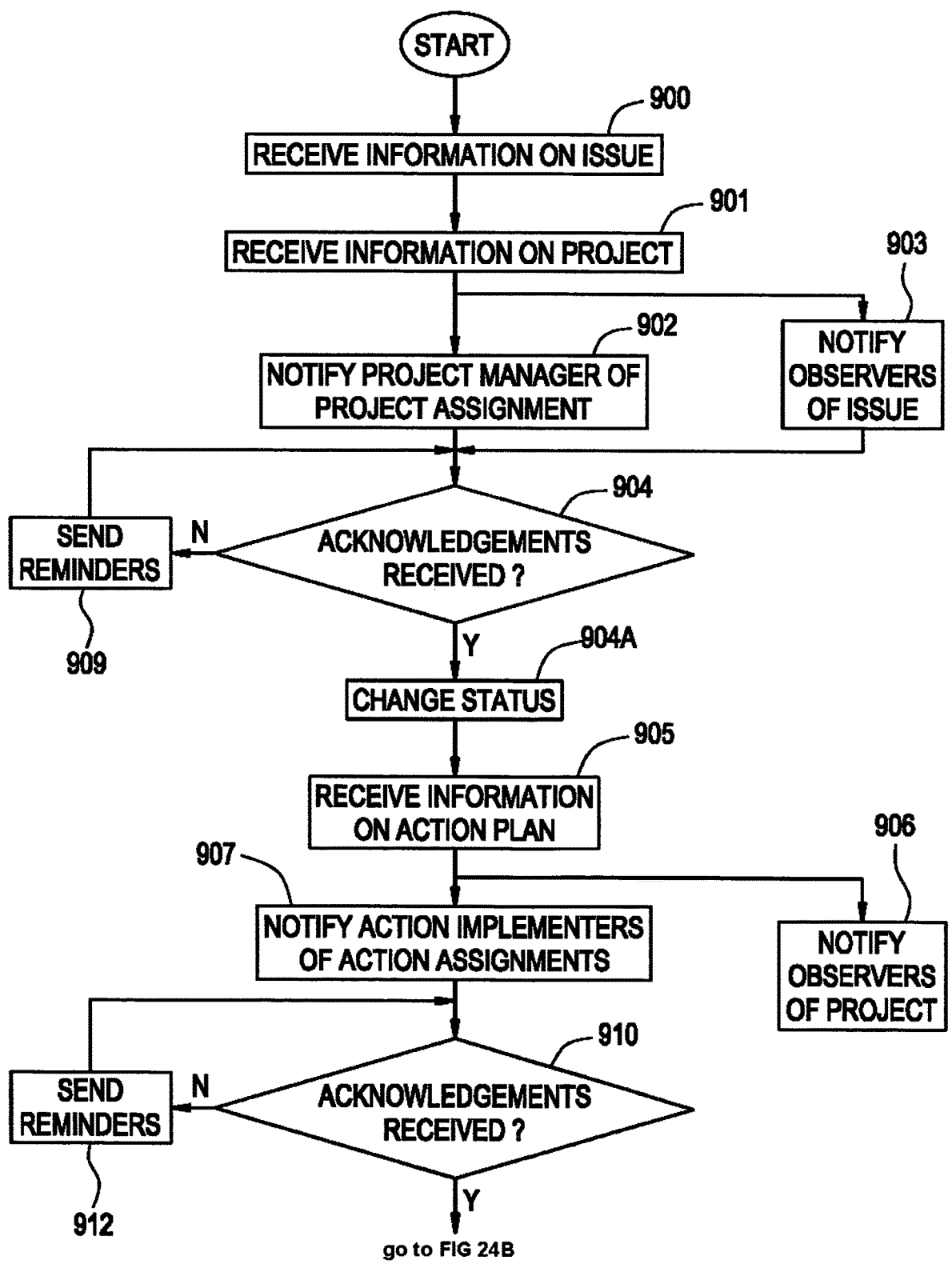

The Activity Report page (see FIG. 24) can be accessed by selecting the Activity Report item under the Report Menu option. The date range (start and end date) and the reports desired can be selected by clicking on Create Report, for example, and the program 110 will create a single file containing all of the Reports selected.

Operational Example

In one example of operation consistent with the present invention, a centralized compliance department responsible for reviewing, assessing and overseeing the implementation of new regulatory and legislative changes, for example, is notified of a new regulatory change by a Political Action Committee (PAC). Accordingly, the compliance employee would access the website for the tracking application of the present invention and log into the present system.

Thus, the compliance employee would create an Issue for the new regulation and assigns them self as the Issue Owner. An Issue is the legislative, regulatory or other event that motivates an organization to implement a new requirement, for example.

Accordingly, the Issue Owner, for example, would copy the summary from the PAC, and paste it into the Description field and then add a few Comments outlining how this specifically affects the company. The Issue Owner would then attach a copy of the full-text of the regulation as an html document, for example, which was received from the PAC This information is received by the program 110 in step 900 (see FIGS. 25A-B) to create the Issue. All of this information will be available to everyone who works on this Issue.

The Issue Owner would then input the information into the system, and input information to create a Project for the Legal Department, for example, which the program 110 receives in step 901. Another employee can be assigned as the Project Manager. The Issue Owner would then instruct the program 110 to send an e-mail from the system in step 902, informing the Project Manager of the assigned Project. If Issue Observers are deemed necessary, they can be added by the Issue Owner, and the program 110 will forward the Issue Observers e-mails in step 903. The e-mail contains a web link that takes the Project Manager directly to the description of the Issue where the Project Manager can obtain the full-text of the new regulation.

The Project Manager would then click a button to acknowledge acceptance of the Project Assignment. The program 110 in step 904 will determine if acknowledgement is received. If so, the Project Manager immediately can begin creating an Action Plan involving several personnel in the Legal Department, for example. The program 110 will receive the information on the Action Plan in step 905. If Project Observers are deemed necessary, the user can add the Project Observers and the program 110 will inform them by e-mail in step 906. The Project Manager's Action Plan may contain several Actions, for example, starting with some fact-finding to determine the scope of the necessary changes, which are sent to Action Implementers by the program 110 in step 907, and acknowledgement will be received by the program 110 in step 908.

When the Project Manager has acknowledged the Assignment and has started working on same, the program 110 will change the status from "Awaiting Acknowledgement" to "In Process" in step 904A. This tells the Issue Owner that the Project Manager has already seen and acknowledged the Project and is making the necessary changes.

If the Project Manager does not acknowledge the Project, the Issue Owner can configure the program 110 to send an e-mail reminder in step 909 to the Project Manager every day until he/she acknowledges his Project/Issue.

All of the involved Action Implementers receive e-mails from the program 110 inviting them to acknowledge the Actions, examine the Issue and to complete their assigned Actions in step 910. When acknowledged, the status of the Action Implementers changes to "In Process" in step 911. Reminder emails are automatically sent by the program 110 in step 912 to those who have not acknowledged their assigned Action or are approaching their deadlines to keep everyone on track The program 110 in step 912, also sends reminders regarding compliance, response, and target due dates to the members involved with the Issue.

As each Action is completed, the work is documented in the system by the Action Implementer, which completion status is received by the program 110 in step 913, and the Action is marked as "Ready for Approval" so the Project Manager knows the Action has been performed. Once the Project Manager reviews and approves the Action, the program 110 marks the Action as "Complete" in step 914.

After all of the Actions in a Project's Action Plan are completed, the Project Manager marks the Project as "Ready for Approval" and the program 110 in step 915 sends an email notification to the Issue Owner.

When the Issue Owner marks each Project with its final status of "Complete", and marks the Issue as "Closed" in step 916, the program 110 will close and archive the Issue in step 917.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of monitoring an issue using a computer network, the method comprising:
   receiving regulatory compliance information and one or more company defined departments of an organization from a user through the network;
   creating at least one issue based on the received regulatory compliance information, wherein the issue includes at least one objective to be completed to resolve the issue;
   assigning at least one department of the company defined departments and a first individual as an issue owner for the created issue;
   creating at least one project based on the objective to be completed;
   creating at least one action item for each of the created projects;
   assigning, for each project created, a second individual as a project manager;
   assigning, for each action item created, a third individual as an action implementer;
   sending, by one or more computer processors of the computer network, a message to the project manager through the network, wherein the message informs the project manager of the project manager assignment and includes a web link configured to display a graphical user interface that includes a first user interface control selectable by the project manager to indicate a response accepting the project manager assignment by the project manager and to transmit a reply message including the response indicated by the project manager, wherein the first selectable graphical element and the graphical user interface configured to display the first user interface control are configured based on the message being an assignment notification;
   monitoring, by the one or more computer processors, access of the graphical user interface via activation of the web link included in the message;
   detecting, by the one or more computer processors, a view event associated with access by the project manager to the graphical user interface based on the monitoring, wherein the view event is one event of plurality of events detectable based on the monitoring wherein the plurality of events detectable based on the monitoring include at least: (1) view events associated with users viewing graphical user interfaces via activation of web links included in messages and (2) reply events associated with transmitting reply messages during access of the graphical user interfaces via activation of the web links included in the messages;

generating, by the one or more computer processors, one or more log entries corresponding to events detected based on the monitoring wherein each of the log entries includes a timestamp, information identifying articular user associated with a detected event, and information that indicates the detected event the timestamp including a date and time when the detected event occurred, and wherein the one or more log entries are not editable by users;

determining, by the one or more computer processors, whether the one or more log entries includes a particular log entry that indicates the reply message indicating the response by the project manager was transmitted;

automatically transmitting, by the one or more computer processors, one or more reminder messages to the project manager in response to a determination that the one or more log entries do not include the particular log entry that indicates the reply message including the response indicated by the project manager was transmitted, wherein the one or more reminder messages include a second selectable graphical element adapted to provide, when selected by the project manager, a graphical user interface configured to display a second user interface control selectable by the project manager to indicate a response accepting the project manager assignment, wherein the second selectable graphical element and the graphical user interface configured to display the second user interface control are configured based on the one or more reminder messages being reminder notifications;

receiving feedback from the project manager through the network regarding the progress of each project;

monitoring the progress of each project through the network until each project has been completed in such a way that the issue can be resolved;

communicating the progress of each project, as a percentage complete, to the issue owner until the issue has been finally resolved;

communicating the resolution of the issue to the issue owner, and providing, in response to a query requesting a status for a specified department, a listing of each issue assigned to the specified department, the listing of each issue including the corresponding objective to be completed for each issue and the progress of each project based on the corresponding objective to be completed.

2. The method of claim 1, further comprising sending the third individual, by the one or more computer processors, a message through the network informing the third individual of the action implementer assignment, wherein the message displays a third selectable graphical element adapted to provide, when selected by the third individual, a graphical user interface configured to display a third user interface control selectable by the third individual to indicate a response accepting the action implementer assignment by the third individual and to transmit a reply message including the response indicated by the third individual, wherein the third selectable graphical element and the graphical user interface configured to display the third user interface control are configured based on the message to the third individual being an assignment notification;

making a determination, by the one or more computer processors, whether the reply message indicating the response by the third individual was transmitted;

performing transmission, by the one or more computer processors, of one or more reminder messages to the third individual in response to the determination being made that the reply message including the response indicated by the third individual was not transmitted, wherein the one or more reminder messages to the third individual include a fourth selectable graphical element adapted to provide, when selected by the third individual, a graphical user interface configured to display a fourth, user interface control selectable by the third individual to indicate a response accepting the action implementer assignment, wherein the fourth selectable graphical element and the graphical user interface configured to display the fourth user interface control are configured based on the one or more reminder messages to the third individual being reminder notifications.

3. The method of claim 2, further comprising receiving feedback from the action implementer through the network regarding the progress of each action item.

4. The method of claim 1, further comprising creating a plurality of issues and using the network to display the plurality of issues in an issue list.

5. The method of claim 4, wherein each issue is sorted and displayed in the issue list according to one or more predetermined criteria selected by the user.

6. The method of claim 5, wherein the predetermined criteria from which the user may select includes Jurisdictions, Categories, Departments, Issue Owner, Status, Priority, Business Units, Products, Enacted Date, Effective Date, Compliance Date, and Issue Number.

7. The method of claim 1, further comprising maintaining a journal of events that occur during resolution of the issue.

8. The method of claim 7, wherein the journal includes the date and time an event took place, the user that initiated the event, and a description of the event.

9. The method of claim 1, further comprising receiving information from an external source.

10. The method of claim 1, further comprising generating a report showing activity on at least one of the created issues over a predetermined period of time.

11. The method of claim 10, wherein the report includes predetermined criteria that the user can select to format the report.

12. The method of claim 11, wherein the predetermined criteria include Product, Issue Creator, Issue Owner, Priority, Business, Category, Department, and Jurisdiction.

13. The method of claim 1, further comprising forwarding information regarding the issue to an individual who is not assigned as the issue owner, project manager, or action implementer.

14. A method for monitoring an issue using a computer network, the method comprising:
receiving a regulatory compliance requirement;
determining an action plan having at least one required action based on the regulatory compliance requirement;
determining a compliance date by which the action plan must be completed;
sending, by one or more computer processors of the computer network, a message to an individual through the network, wherein the message informs the individual of a role to be played by the individual in completing the action plan and displays a first selectable graphical element adapted to provide, when selected by the individual, a graphical user interface configured to display a first user interface control selectable by the individual to indicate a response accepting the role by the individual and to transmit a reply message including the response indicated by the individual, wherein the first selectable graphical element and the graphical user interface configured to display the first user interface control are configured based on the message being an assignment notification;

sending, by one or more computer processors of the computer network, a message to the project manager through the network, wherein the message informs the project manager of the project manager assignment and includes a web link configured to display a graphical user interface that includes a first user interface control selectable by the project manager to indicate a response accepting the project manager assignment by the project manager and to transmit a reply message including the response indicated by the project manager, wherein the first selectable graphical element and the graphical user interface configured to display the first user interface control are configured based on the message being an assignment notification;

monitoring, by the one or more computer processors access of the graphical user interface via activation of the web link included in the message;

detecting, by the one or more computer processors, a view event associated with access by the project manager to the graphical user interface based on the monitoring, wherein the view event is one event of plurality of events detectable based on the monitoring, wherein the plurality of events detectable based on the monitoring include at least: (1) view events associated with users viewing graphical user interfaces via activation of web links included in messages and (2) reply events associated with transmitting reply messages during access of the graphical user interfaces via activation of the web links included in the messages;

generating, by the one or more computer processors, one or more log entries corresponding to events detected based on the monitoring, wherein each of the log entries includes a timestamp, information identifying a articular user associated with a detected event, and information that indicates the detected event, the timestamp including a date and time when the detected event occurred, and wherein the one or more log entries are not editable by users;

determining, by the one or more computer processors, whether the one or more log entries includes a particular lot entry that indicates the reply message indicating the response by the individual was transmitted;

automatically transmitting, by the one or more computer processors, one or more reminder messages to the individual in response to a determination that the one or more log entries do not include the articular log entry that indicates the reply message including the response indicated by the individual was transmitted, wherein the one or more reminder messages include a second selectable graphical element adapted to provide, when selected by the individual, a graphical user interface configured to display a second, user interface control selectable by the individual to indicate a response accepting the role, wherein the second selectable graphical element and the graphical user interface configured to display the second user interface control are configured based on the one or more reminder messages being reminder notifications;

reporting progress of the action plan until the at least one required action is complete; and communicating resolution of the action plan to an issue owner once the at least one required action is complete.

15. The method of claim 14, wherein the regulatory compliance requirement is a proposed or pending insurance requirement.

16. The method of claim 14, wherein the regulatory compliance requirement is one selected from the group consisting of a statute, a regulation, case law, a contract, and an agency bulletin.

17. The method of claim 14, wherein the progress includes progress as a percentage complete.

18. A method of monitoring an issue, the method comprising:

receiving one or more regulatory compliance requirements associated with at least one jurisdiction from a user;

creating at least one issue for each regulatory compliance requirement, wherein the issue includes at least one objective to be completed to resolve the regulatory compliance requirement;

creating at least one project based on the objective to be completed, wherein the at least one project comprises at least one action item;

assigning at least one individual as an issue owner for the at least one issue, a project manager for the at least one project and an action implementer for the at least one action item;

sending, by one or more computer processors of a computer network, at least one message to the at least one individual through the network, wherein the at least one message informs the at least one individual of at least one role to be played by the at least one individual with respect to the project and includes a web link configured to display a graphical user interface that includes a first user interface control selectable by the at least one individual to indicate at least one response by the at least one individual and to transmit at least one reply message including the at least one response accepting the at least one role indicated by the at least one individual, wherein the first selectable graphical element and the graphical user interface configured to display the first user interface control are configured based on the message being an assignment notification;

monitoring by the one or more computer processors, access of the graphical user interface via activation of the web link included in the message;

detecting, by the one or more computer processors a view event associated with access by the project manager to the graphical user interface based on the monitoring, wherein the view event is one event of plurality of events detectable based on the monitoring, wherein the plurality of events detectable based on the monitoring include at least: (1) view events associated with users viewing graphical user interfaces via activation of web links included in messages and (2) reply events associated with transmitting reply messages during access of the graphical user interfaces via activation of the web links included in the messages;

generating, by the one or more computer processors, one or more log entries corresponding to events detected based on the monitoring, wherein each of the log entries includes a timestamp, information identifying a particular user associated with a detected event, and information that indicates the detected event, the timestamp including a date and time when the detected event occurred, and wherein the one or more log entries are not editable by users;

determining, the one or more computer processors, whether the one or more log entries includes a particular log entry that indicates the at least one reply message indicating the at least one response by the at least one individual was transmitted;

automatically transmitting, the one or more computer processors, of one or more reminder messages to the at least one individual in response to a determination that the one or more lot entries do not include the particular log entry that indicates the at least one reply message including the at least one response indicated by the at least one individual was transmitted, wherein the one or more reminder messages include a second selectable graphical element adapted to provide, when selected by the at least one individual, a graphical user interface configured to display a second user interface control selectable by the at least one individual to indicate a response accepting the at least one role, wherein the second selectable graphical element and the graphical user interface configured to display the second user interface control are configured based on the one or more reminder messages being reminder notifications, indexing each issue according to the at least one jurisdiction associated with each regulatory compliance requirement;

receiving feedback from the at least one individual regarding a status of each project;

receiving a query regarding one or more regulatory compliance requirements specifying a particular jurisdiction;

determining, in response to the query, the progress of each project for the one or more regulatory compliance requirements specified in the particular jurisdiction; and communicating, in response to the query, the progress of each project for the one or more regulatory compliance requirements specified in the particular jurisdiction.

19. The method of claim 1, wherein the first user interface control selectable by the project manager to indicate a response by the project manager includes:

a user interface control selectable by the project manager to indicate acceptance by the project manager of the project manager assignment and that creation of an action plan by the project manager has not yet been completed;

a user interface control selectable by the project manager to indicate acceptance by the project manager of the project manager assignment and that creation of an action plan by the project manager has been completed; and a user interface control selectable by the project manager to indicate rejection by the project manager of the project manager assignment.

20. The method of claim 2, wherein the third user interface control selectable by the third individual to indicate a response by the third individual include:

a user interface control selectable by the third individual to indicate acceptance by the third individual of the action implementer assignment and that an action required of the third individual has not yet been completed;

a user interface control selectable by the third individual to indicate acceptance by the third individual of the action implementer assignment and that an action required of the third individual has been completed; and a user interface control selectable by the third individual to indicate rejection by the third individual of the action implementer assignment.

21. The method of claim 14, wherein the o first user interface control selectable by the individual to indicate a response by the individual includes:

a user interface control selectable by the individual to indicate acceptance by the individual of the role to be played by the individual in completing the action plan and that an action required of the individual has not yet been completed;

a user interface control selectable by the individual to indicate acceptance by the individual of the role to be played by the individual in completing the action plan and that an action required of the individual has been completed; and a user interface control selectable by the individual to indicate rejection by the individual of the role to be played by the individual in completing the action plan.

22. The method of claim 18, wherein the first user interface control selectable by the at least one individual to indicate at least one response by the at least one individual includes:

a user interface control selectable by the at least one individual to indicate acceptance by the at least one individual of the at least one role to be played by the at least one individual with respect to the project and that the at least one individual has not yet completed fulfillment of the at least one role;

a user interface control selectable by the at least one individual to indicate acceptance by the at least one individual of the at least one role to be played by the at least one individual with respect to the project and that the at least one individual has completed fulfillment of the at least one role; and a user interface control selectable by the at least one individual to indicate rejection of the at least one role to be played by the at least one individual with respect to the project.

23. The method of claim 1, wherein the communicating the resolution includes sending a resolution message to the issue owner, wherein the resolution message include a fifth selectable graphical element adapted to provide, when selected by the issue owner, a graphical user interface configured to display an issue resolution page, wherein the fifth selectable graphical element and the graphical user interface configured to display the issue resolution page are configured based on the resolution reminder message being a resolution notification.

* * * * *

UNITED STATES PATENT AND TRADEMARK OFFICE
CERTIFICATE OF CORRECTION

PATENT NO. : 10,748,158 B2
APPLICATION NO. : 11/245240
DATED : August 18, 2020
INVENTOR(S) : William R. Oden et al.

It is certified that error appears in the above-identified patent and that said Letters Patent is hereby corrected as shown below:

In the Specification

At Column 6, Line number 52, delete "personal computer $(P)_q$" and replace with --personal computer (PC)--.
At Column 20, Line number 43, delete "inks to the Attachments" and replace with --Links to the Attachment--.

In the Claims

At Column 27, Claim number 1, Line number 3, delete "based on the monitoring wherein" and replace with --based on the monitoring, wherein--.
At Column 27, Claim number 1, Line number 13, delete "based on the monitoring wherein" and replace with --based on the monitoring, wherein--.
At Column 27, Claim number 1, Line number 14, delete "articular" and replace with --particular--.
At Column 27, Claim number 1, Line number 50, delete "owner, and" and replace with --owner; and--.
At Column 28, Claim number 2, Line number 17, delete "a fourth, user" and replace with --a fourth user--.
At Column 29, Claim number 14, starting at Line number 27, delete "one or more computer processors access" and replace with --one or more computer processors, access--.
At Column 29, Claim number 14, Line number 46, delete "articular" and replace with --particular--.
At Column 29, Claim number 14, Line number 53, delete "lot entry" and replace with --log entry--.
At Column 29, Claim number 14, Line number 58, delete "articular" and replace with --particular--.
At Column 29, Claim number 14, Line number 64, delete "a second, user" and replace with --a second user--.
At Column 30, Claim number 18, Line number 49, delete "monitoring by the one or more" and replace with --monitoring, by the one of more--.
At Column 30, Claim number 18, Line number 52, delete "one or more computer processors a view" and replace with --one or more computer processors, a view--.

Signed and Sealed this
First Day of December, 2020

Andrei Iancu
*Director of the United States Patent and Trademark Office*

CERTIFICATE OF CORRECTION (continued)
U.S. Pat. No. 10,748,158 B2

At Column 31, Claim number 18, Line number 14, delete "lot entries" and replace with --log entries--.
At Column 31, Claim number 18, Line number 27, delete "reminder notifications," and replace with --reminder notifications;--.